United States Patent [19]
Ching et al.

[11] Patent Number: 5,859,145
[45] Date of Patent: Jan. 12, 1999

[54] COMPOSITIONS HAVING ETHYLENIC BACKBONE AND BENZYLIC, ALLYLIC, OR ETHER-CONTAINING SIDE-CHAINS, OXYGEN SCAVENGING COMPOSITIONS CONTAINING SAME, AND PROCESS FOR MAKING THESE COMPOSITIONS BY ESTERIFICATION OR TRANSESTERIFICATION OF A POLYMER MELT

[75] Inventors: Ta Yen Ching, Novato; Kiyoshi Katsumoto, El Cerrito; Steven P. Current, Novato, all of Calif.; Leslie P. Theard, Houston, Tex.

[73] Assignee: Chevron Chemical Company, San Ramon, Calif.

[21] Appl. No.: 477,020

[22] Filed: Jun. 7, 1995

Related U.S. Application Data

[63] Continuation of Ser. No. 377,872, Jan. 25, 1995, abandoned, which is a continuation-in-part of Ser. No. 275,056, Jul. 13, 1994, abandoned, which is a continuation-in-part of Ser. No. 275,058, Jul. 13, 1994, abandoned, which is a continuation-in-part of Ser. No. 91,120, Jul. 13, 1993, abandoned.

[51] Int. Cl.$^6$ ................................................... C08F 120/10
[52] U.S. Cl. ..................... 525/330.6; 525/370; 525/371; 525/372; 525/384
[58] Field of Search ..................... 524/348; 525/330.6, 525/370, 371, 372, 384

[56] References Cited

U.S. PATENT DOCUMENTS

| | | |
|---|---|---|
| 4,755,379 | 7/1988 | Jozefonvicz et al. ..................... 424/83 |
| 5,021,295 | 6/1991 | Nakane et al. ..................... 428/379 |
| 5,202,052 | 4/1993 | Zenner et al. ..................... 252/188.28 |
| 5,211,875 | 5/1993 | Speer et al. ..................... 252/188.28 |

FOREIGN PATENT DOCUMENTS

| | | | |
|---|---|---|---|
| 0 519 616 A1 | 12/1992 | European Pat. Off. | .......... C08K 3/00 |
| 0 542 512 A1 | 5/1993 | European Pat. Off. | ........ C09K 15/16 |
| 5093189 | 4/1993 | Japan . | |

*Primary Examiner*—Jeffrey T. Smith
*Attorney, Agent, or Firm*—Marianne H. Michel

[57] ABSTRACT

Disclosed is a process for esterifying and/or transesterifying a polymer having a polyethylenic backbone and pendant acid and/or ester moieties comprising contacting a melt of the polymer with a transesterifying compound so that the polymer undergoes esterification and/or transesterification but not alcoholysis. The esterified or transesterified polymer also has pendant ester moieties which differ in kind and/or number from the unreacted polymer. In one embodiment, the process also comprises adding an amount of a transition metal salt that is effective to promote oxygen scavenging. Also in a further embodiment, the process comprises irradiating the transesterified polymer with actinic radiation to reduce the induction period before oxygen scavenging commences. Also disclosed are compositions comprising a component which comprises an ethylenic or polyethylenic backbone and a pendant or terminal moiety comprising a benzylic, allylic, or ether-containing radical. The invention also embodies new polyethylenic oxygen scavenging compositions comprising a transition-metal salt and the above component. Methods of making the compositions, and methods and compositions using the ethylenic or polyethylenic compositions, are disclosed.

15 Claims, 5 Drawing Sheets

COMPOSITIONS HAVING ETHYLENIC BACKBONE AND BENZYLIC, ALLYLIC, OR ETHER-CONTAINING SIDE-CHAINS, OXYGEN SCAVENGING COMPOSITIONS CONTAINING SAME, AND PROCESS FOR MAKING THESE COMPOSITIONS BY ESTERIFICATION OR TRANSESTERIFICATION OF A POLYMER MELT

This application is a continuation of 377,872, filed Jan. 25, 1995, abandoned, which is a continuation-in-part application of U.S. Ser. Nos. 08/275,056 and 08/275,058, both filed Jul. 13, 1994, which are continuation-in-part applications of U.S. Ser. No. 08/091,120, filed Jul. 13, 1993, all now abandoned.

FIELD OF THE INVENTION

The invention comprises compositions having an ethylenic or polyethylenic backbone that are useful in packaging or adhesives applications. This invention also provides compositions having an ethylenic or polyethylenic backbone that are useful in scavenging oxygen from packaged products. The invention also comprises a process for esterification and/or transesterification of a compound having acid and/or ester side chains on an ethylenic or polyethylenic backbone to produce a compound having a different number and/or type of ester side-chain on the ethylenic or polyethylenic backbone.

BACKGROUND AND SUMMARY OF THE INVENTION

New polymer compositions having properties that are particularly tailored for specific applications are required in response to more sophisticated purchasers of polymers. It is extremely costly and/or difficult to make these compositions directly by synthesis or via solution esterification or transesterification, but manufacturing them in mixing equipment such as an extruder has provided an economical and viable means to supply increasingly-complex polymers to specialized markets requiring them.

In one embodiment, this invention provides specialty polymers whose compositions have a polyethylenic backbone and pendant benzyl ester moieties. In another embodiment, this invention provides compositions having a polyethylenic backbone and pendant hydrocarbyl ester moieties that contain at least one allylic hydrogen. In a further embodiment, this invention provides compositions having a polyethylenic backbone and pendant hydrocarbyl moieties, especially hydrocarbyl ester moieties, wherein the hyrocarbyl group contains a heteroatom such as oxygen. In a preferred embodiment, this invention provides compositions having a polyethylenic backbone and pendant ether ester moieties, especially cyclic ether ester moieties. In certain preferred embodiments, the compositions of this invention have the following structures:

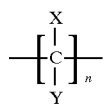

where n is an integer from 2 to approximately 30,000; any X is individually chosen from the group consisting of hydrogen and methyl radical; and where any Y is individually chosen from the group consisting of hydrogen, alkyl radicals containing from 1 to 18 carbon atoms, alkoxy radicals having from 1 to 16 carbon atoms, alkyl ether radicals having from 2 to 18 carbon atoms, alkenyl and alkynyl radicals containing from 2 to 18 carbon atoms, alkenoxy and alkynoxy radicals having from 2 to 16 carbon atoms, alkenyl and alkynyl ether radicals having from 3 to 18 carbon atoms, amine radicals having from 1 to 16 carbon atoms, acid and metal salt of acid radicals, anhydride radicals having from 4 to 24 carbon atoms, ester and amide radicals of acids having from 1 to 16 carbon atoms, aryl radicals and substituted aryl radicals having 6 to 24 carbon atoms, aryl ether radicals and substituted aryl ether radicals having from 6 to 24 carbon atoms, and the radicals of Formula II and Formula III

where any A is individually a heteroatom-containing radical (especially a carboxy or amido), and where any B is individually chosen from the group consisting of alkyl ether radicals having from 2 to 18 carbon atoms, alkenyl and alkynyl radicals containing from 2 to 18 carbon atoms, alkenoxy and alkynoxy radicals having from 2 to 16 carbon atoms, alkenyl and alkynyl ether radicals having from 3 to 18 carbon atoms, substituted aryl radicals having 6 to 24 carbon atoms, aryl ether radicals and substituted aryl ether radicals having from 6 to 24 carbon atoms, and the radicals of Formula IV and Formula V:

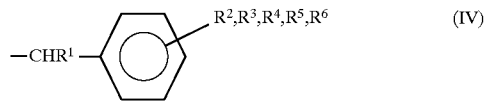

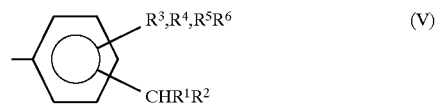

where any $R^1$, $R^2$, $R^3$, $R^4$, $R^5$, and $R^6$ is individually chosen from the group consisting of hydrogen, alkyl radicals containing from 1 to 18 carbon atoms, alkoxy radicals having from 1 to 16 carbon atoms, amine radicals having from 1 to 6 carbon atoms, ester and amide radicals of acids having from 1 to 16 carbon atoms, aryl radicals and substituted aryl radicals having 6 to 24 carbon atoms, aryl ether radicals and substituted aryl ether radicals having from 6 to 24 carbon atoms, and the radicals of Formula II and Formula III; with the proviso that at least about 1 mole % of the composition comprises the radicals of Formula II and Formula III.

These specialty polymers are useful as packaging films and are also useful components for making oxygen-scavenging compositions.

This invention also provides new oxygen-scavenging compositions. It is well known that regulating the exposure of oxygen-sensitive products to oxygen maintains and enhances the quality and "shelf-life" of the product. For instance, by limiting the exposure of oxygen sensitive food products to oxygen in a packaging system, the quality or freshness of food is maintained, and the food doesn't spoil as rapidly. In addition, oxygen-scavenging packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is through "active packaging", whereby the package containing the food product has been modified in some manner to regulate the food's exposure to oxygen. One form of active packaging uses oxygen-scavenging sachets which contain a composition which scavenges the oxygen through oxidation reactions. One type of sachet contains iron-based compositions which oxidize to their ferric states. Another type of sachet contains unsaturated fatty acid salts on a particulate adsorbent. See U.S. Pat. No. 4,908,151. Yet another sachet contains metal/polyamide complex. See U.S. Pat. No. 5,194,478.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate. Further, the sachets can present a danger to consumers if accidentally ingested.

Another means for regulating exposure of a packaged product to oxygen involves incorporating an oxygen scavenger into the packaging structure itself. A more uniform scavenging effect throughout the package is achieved by incorporating the scavenging material in the package instead of adding a separate scavenger structure (e.g., a sachet) to the package. This may be especially important where there is restricted air flow inside the package. In addition, incorporating the oxygen scavenger into the package structure provides a means of intercepting and scavenging oxygen as it permeates the walls of the package (herein referred to as an "active oxygen barrier"), thereby maintaining the lowest possible oxygen level in the package.

One attempt to prepare an oxygen-scavenging wall involves the incorporation of inorganic powders and/or salts. See U.S. Pat. Nos. 5,153,038, 5,116,660, 5,143,769, and 5,089,323. However, incorporation of these powders and/or salts causes degradation of the wall's transparency and mechanical properties such as tear strength. In addition, these compounds can lead to processing difficulties, especially when fabricating thin films. The oxidation products, which can be absorbed by food in the container, typically would not have FDA approval for human consumption.

EP 0 519 616 discloses an oxygen-scavenging composition comprising a blend of a first polymeric component comprising a polyolefin, the first polymeric component having been grafted with an unsaturated carboxylic anhydride or an unsaturated carboxylic acid, or combinations thereof, or with an epoxide; a second polymeric component having OH, SH, or $NHR^2$ groups where $R^2$ is H, $C_1$–$C_3$ alky, substituted $C_1$–$C_3$ alkyl; and a metal salt capable of catalyzing the reaction between oxygen and the second polymeric component, the polyolefin being present in an amount sufficient so that the blend is non phase-separated. A blend of polymers is utilized to obtain oxygen scavenging, and the second polymeric component is preferably a polyamide or a copolyamide such as the copolymer of m-xylylene-diamine and adipic acid (MXD6).

The oxygen scavenging systems disclosed in U.S. Pat. Nos. 5,021,515, 5,194,478, and 5,159,005, European Publication EP 0 380 319 as well as PCT Publication Nos. 90/00504 and 90/00578 illustrate attempts to produce an oxygen-scavenging wall. These patent applications disclose incorporating a metal catalyst-polyamide oxygen scavenging system into the package wall. Through catalyzed oxidation of the polyamide, the package wall regulates the amount of oxygen which reaches the interior volume of the package (active oxygen barrier) and has been reported to have oxygen scavenging rate capabilities up to about 5 cubic centimeters (cc) oxygen per square meter per day at ambient conditions. However, this system suffers from significant disadvantages.

One particularly limiting disadvantage of polyamide/catalyst materials can be a low oxygen scavenging rate. U.S. Pat. No. 5,021,515, Example 7, illustrates that adding these materials to a high-barrier package containing air produces a package which is not generally suitable for creating an internal oxygen level of less than 0.1% (starting with air) within a period of four weeks or less at room temperature, as is typically required for headspace oxygen scavenging applications.

There are also disadvantages to having the oxygen-scavenging groups in the backbone or network structure in this type of polyamide polymer. The basic polymer structure degrades rapidly and is quickly weakened upon reaction with oxygen. This can adversely affect physical properties such as tensile or impact strength of the polymer. The degradation of the backbone or network of the polymer can increase the permeability of the polymer to those materials sought to be excluded, such as oxygen.

Moreover, polyamides such as MXD6 are typically incompatible with thermoplastic polymers used in flexible packaging walls, such as ethylene-vinyl acetate copolymers and low density polyethylene. Even further, when many polyamides are used by themselves to make a flexible package wall, they may result in inappropriately stiff structures. Many polyamides also incur processing difficulties and higher costs when compared with the costs of thermoplastic polymers typically used to make flexible packaging. Even further, they are sometimes difficult to heat seal. Thus, all of these are factors to consider when selecting materials for packages, especially flexible packages and when selecting systems for reducing oxygen exposure of packaged products.

Another approach to scavenging oxygen is disclosed in EP 0 507 207, which discloses an oxygen-scavenging composition comprising an ethylenically unsaturated hydrocarbon and a transition metal catalyst. This patent states that ethylenically unsaturated compounds such as squalene, dehydrated castor oil, and 1,2-polybutadiene are useful oxygen scavenging compositions, and ethylenically saturated compounds such as polyethylene and ethylene copolymers are used as diluents. Compositions utilizing squalene, castor oil, or other such unsaturated hydrocarbon typically have an oily texture, which is undesirable for applications such as wrapping meat for sale in retail grocery stores. Further, polymer chains which are ethylenically unsaturated would be expected to either cross-link to become brittle or to degrade upon scavenging oxygen, weakening the polymer due to polymer backbone breakage.

U.S. Pat. Nos. 4,717,759, 4,994,539, and 4,736,007, which are incorporated by reference in their entirety, disclose ethylene copolymers which comprise 85.0 to 99.995 mol % of an ethylene unit, 0.005 to 5 mol % of a comonomer unit represented by Formula (VI)

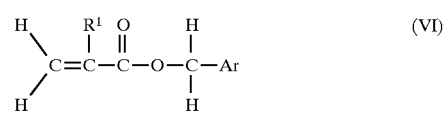

wherein Ar is

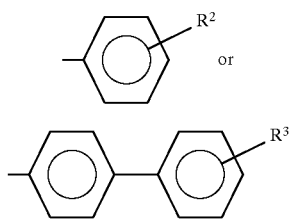

$R_1$ is a hydrogen atom or a methyl group, each of $R_2$ and $R_3$ is a hydrogen atom, a chlorine atom or a straight-chain or a side-chain alkyl group having 1 to 4 carbon atoms, and 0 to 10 mol % of an ethylenic unsaturated monomer unit, the ethylene copolymer having a density of 0.860 to 0.970 g/cm³ and a melt index of 0.05 to 100 g/10 minutes. The patent states that copolymers may be produced using either a Ziegler catalyst or through polymerization catalyzed by free radicals. These polymers are limited to having less than 5 mol % of the comonomer unit and are useful for electrical insulation. Although these polymers may be used to make oxygen-scavenging compositions, these polymers do not themselves scavenge oxygen.

What has been needed is an oxygen-scavenging polymer composition that is easily processed, especially into thin film, and that does not suffer rapid polymer backbone oxidation as the composition scavenges oxygen. This invention supplies compositions overcoming these problems.

The oxygen-scavenging compositions of this invention comprise a transition-metal salt and a compound having an ethylenic or polyethylenic backbone and having pendant or terminal moieties which contain a carbon atom that can form a free radical that is resonance-stabilized by an adjacent group. Thus, a carbon atom having a hydrogen atom adjacent to a phenyl radical, an ethylenically-unsaturated carbon atom, or a heteroatom such as oxygen can form a free radical that is resonance-stabilized by the adjacent double bond, phenyl ring, or oxygen, respectively.

In one embodiment, the invention provides a composition comprising a transition-metal salt and a component having the structure of Formula (I) above. The invention also provides new compositions comprising a transition-metal salt and a polymer which comprises a polyethylenic backbone and a pendant moiety comprising a benzyl radical having at least one hydrogen atom on the methylene group of the benzyl radical, and/or an allylic radical and/or an ether radical that individually contain at least one hydrogen atom alpha to these radicals.

In another embodiment, the invention provides a composition comprising a transition-metal salt and a polymer, where said polymer comprises 1) a polyethylenic backbone, and 2) pendant moieties which have at least one radical selected from the group consisting of a) benzyl ester radicals, b) N-benzyl-amide radicals, c) N-benzylimide radicals, d) benzyl-thio radicals, e) benzyl ketone radicals, f) benzyl-ether radicals, g) aryl radicals and substituted aryl radicals having 6 to 30 carbon atoms, h) aryl ether radicals and substituted aryl ether radicals having from 6 to 30 carbon atoms, and i) benzyl radicals which have the phenyl radical of said benzyl radical chemically bonded to at least one member selected from the group consisting of imide radicals which are N-substituted with said benzyl radicals, benzyl-ketone radicals, alkyl radicals containing from 1 to 18 carbon atoms, alkoxy radicals having from 1 to 16 carbon atoms, amine radicals having from 1 to 6 carbon atoms, ester and amide radicals of acids, said ester and amide radicals having from 1 to 16 carbon atoms, aryl radicals and substituted aryl radicals having 6 to 24 carbon atoms, and aryl ether radicals and substituted aryl ether radicals having from 6 to 24 carbon atoms.

In another embodiment, the invention provides a composition comprising a transition-metal salt and an ethylenic or polyethylenic backbone having a pendant or terminal benzyl radical, wherein the composition, upon reaction with molecular oxygen, produces benzoic acid or a benzoic acid substituted with at least one radical selected from the group consisting of alkyl radicals containing from 1 to 18 carbon atoms, alkoxy radicals having from 1 to 16 carbon atoms, amine radicals having from 1 to 6 carbon atoms, ester and amide radicals of acids having from 1 to 16 carbon atoms, aryl radicals and substituted aryl radicals having 6 to 24 carbon atoms, and aryl ether radicals and substituted aryl ether radicals having from 6 to 24 carbon atoms.

The invention also provides a composition comprising an ethylenic or polyethylenic backbone and moieties which contain a radical having an allylic hydrogen and which are pendant or terminal to the ethylenic or polyethylenic backbone. The radical containing allylic hydrogen may be cyclic, linear, or branched, and may be unsubstituted or substituted with alkyl, aryl, or heteroatom-containing radicals, for example.

The invention also provides a composition comprising an ethylenic or polyethylenic backbone and hydrocarbyl moieties which contain at least one hydrogen alpha to an ether radical and which are pendant or terminal to the ethylenic or polyethylenic backbone. The moiety containing ether may be cyclic, linear, or branched, and may be unsubstituted or substituted with alkyl, aryl, or other radicals containing a heteroatom, for example.

Among other factors, the present invention is based on our finding that compositions as described herein are highly effective oxygen scavengers in terms of rate of oxygen scavenging and/or oxygen scavenging capacity, particularly where the compositions contain a heteroatom-containing radical such as a carboxy or amido group directly bonded to a benzyl radical, an allylic radical, or an ether radical. In many instances, these compositions have excellent physical and processing properties which permit their incorporation into a wide range of packaging applications. We have found that, typically, films of these compositions are easily made using conventional techniques. The compositions are usually compatible with many common thermoplastic materials used in packaging, particularly polyethylene and copolymers of ethylene and alkyl acrylates or methacrylates.

Furthermore, many of the compositions of the present invention have been found to have surprisingly reduced induction periods in scavenging oxygen upon exposure to ultraviolet (UV) radiation without the need for added photoinitiators.

This invention also provides a process for making polymers, some of which are useful in making oxygen scavenging compositions. Transesterification of a polymer can produce a number of different polymers. For example, M. Lambla et al., 27 *Polymer Sci. and Eng'g*, No. 16 (mid-Sept. 1987) 1221–28, discuss the transesterification of ethylene vinyl acetate copolymer with an alcohol in an extruder and in the presence of a tin catalyst to form ethylene vinyl alcohol copolymer, which has a polyethylenic backbone and pendant alcohol moieties. Also, D. Seebach et al., *Synthesis* (Feb. 1982) 138–41, discuss transesterification of an ester with an alcohol in solution using a titanium catalyst. The reactions require from 3 to 120 hours.

U.S. Pat. No. 4,767,820 to M. Keogh discloses compositions useful as extrudates about wires and cables which comprise hydrolyzable pendant silane moieties and tetramethyl titanate dispersed in a normally solid alkylene-alkyl acrylate copolymer matrix. Transalkylation of the silane and alkyl acrylate moieties results in a cross-linked product.

Not all transesterification reactions are useful. U.S. Pat. No. 5,023,284 to M. Cheung et al. notes that transesterification occurs during melt-blending of two polyesters due to the presence of residual titanium catalyst and causes embrittlement and other deleterious effects.

What has been missing in the prior art is an economical process for controlling the esterification and/or transesterification of a polymer having a polyethylenic backbone and pendant acid and/or ester moieties to produce a polymer having a polyethylenic backbone and pendant ester moieties that differ in number and/or type from the unreacted polymer. In one embodiment, this invention provides an economical process for esterifying or transesterifying a polymer comprising forming a melt of a polymer having a polyethylenic backbone and pendant acid or ester moieties, and contacting the melt in suitable mixing equipment (for example, an extruder) under esterification or transesterification conditions with a compound capable of esterifying or transesterifying the acid or ester moieties, where the polymer undergoes esterification and/or transesterification but not alcoholysis, and the polymer after esterification and/or transesterification has a polyethylenic backbone and pendant ester moieties.

The process may further comprise adding an amount of transition metal salt into a melt of selected esterified or transesterified polymers made in the above process in an amount effective to promote oxygen scavenging by the esterified or transesterified polymer. In one preferred embodiment, an ethylene alkyl acrylate copolymer is transesterified in an extruder to form an ethylene hydrocarbyl acrylate copolymer. In another preferred embodiment of the process, a cobalt salt is added to the transesterified polymer to make an effective oxygen scavenger. In a third preferred embodiment, the processed polymer is exposed to actinic radiation.

Among other factors, it has been discovered that a melt of a polymer having pendant acid and/or ester moieties can be esterified and/or transesterified with a compound capable of esterifying or transesterifying the acid and/or ester moieties by blending the melt and the compound in suitable polymer mixing equipment under esterification and/or transesterification conditions, thereby producing a polymer having pendant ester moieties which differ in number and/or type from the unreacted polymer. This process provides fast reaction times and accurate control over the extent of esterification and/or transesterification, thereby providing an economical means to produce polymers having properties tailored to specific applications. The process also provides a means to make highly-effective oxygen scavenging compositions.

This invention also provides compositions that can be made by the process of esterifying or transesterifying a melt of a polymer having an ethylenic or polyethylenic backbone. The above-mentioned advantages and others are further described below.

DETAILED DESCRIPTION OF PREFERRED EMBODIMENTS

Figure 1:
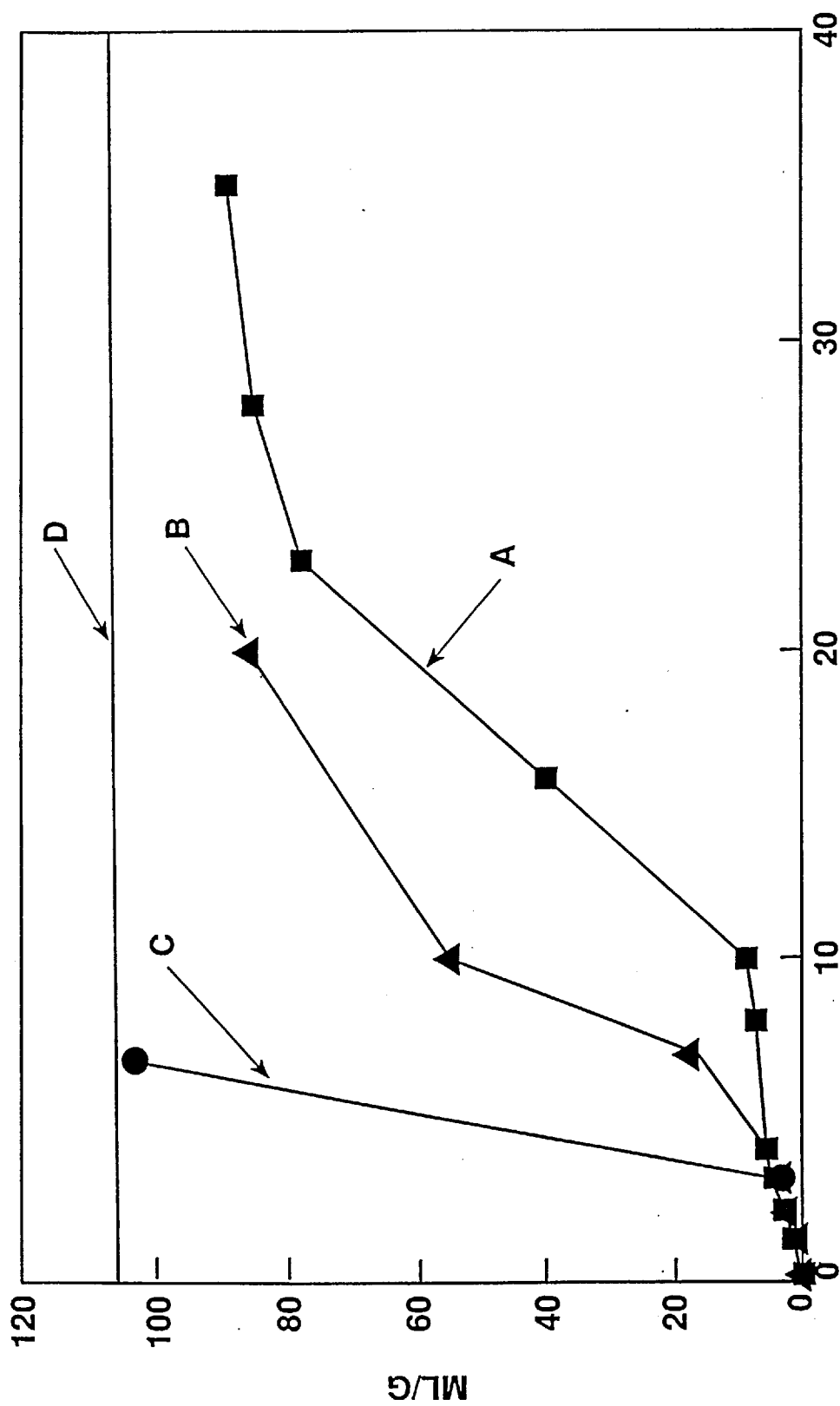
FIG. 1 illustrates the effect on oxygen scavenging rate when substituting methyl or methoxy radicals onto the phenyl ring. The ordinate is time in days, and the abscissa is oxygen uptake, measured in ml/g. Line A shows the oxygen uptake rate for Example 19, B shows the rate for Ex. 23, C shows the rate for Ex. 24, and D shows the theoretical oxygen available. The 2 gram samples in 1000 cc headspace were analyzed using a Mocon analyzer.

The process of this invention provides an economical, convenient, and effective means for making compositions of this invention. These compositions can be divided into two categories: specialty polymers, and specialty polymers capable of scavenging oxygen.

A) Specialty Polymers

The specialty polymers of this invention can be divided into four general categories: benzylic, allylic, ether-containing, and specialty polymers containing functional side-chains. Each contains an ethylenic or polyethylenic backbone with pendant benzylic, allylic, ether-containing, or functional moieties.

A polyethylenic backbone consists essentially of a chain structure or backbone of saturated carbon atoms which, generally, is created during a polymerization process. For example, homopolymerization of ethylene provides a polyethylenic backbone. Copolymerization of ethylene and acrylic acid, methacrylic acid, alkyl acrylate, or alkyl methacrylate also results in a polyethylenic backbone with pendant acid or ester moieties. Any polymerization which provides a composition essentially of the form:

(VII)

provides a composition having an ethylenic or polyethylenic backbone. In general, n is a number between 2 and approximately 30,000. A composition which has a polyethylenic backbone has a melt index from about 0.1 to 1000 g/10 min. A composition which has an ethylenic backbone has fewer carbon atoms in its backbone than an identical composition having a melt index of 1000 g/10 min. or less.

In one preferred embodiment, a polymeric composition of the present invention contains between about one and about ten mole percent of the pendant benzylic, allylic, ether-containing, and/or functional moieties. More preferably, the composition contains between about two and six percent, and more preferably still, between about two and three mole percent of these pendant moieties. Preferably, the pendant moieties are bonded directly to a heteroatom-containing group. The exact amount of pendant moieties and heteroatom-containing radicals is normally determined by the application in which the composition is going to be employed.

1) Benzylic specialty polymers

In one embodiment, a composition of the present invention comprises an ethylenic or polyethylenic backbone and moieties which contain a benzyl radical and which are pendant or terminal to the ethylenic or polyethylenic backbone. A pendant moiety which contains a benzyl radical, as that term is used herein, is any group which is a side-chain or branch or is terminal to the ethylenic or polyethylenic backbone and which contains a benzyl radical. In Formula (VII) above, moieties -X and -Y are pendant moieties.

The benzyl radical, for purposes of this invention, comprises a phenyl radical directly bonded to a methylene radical. The methylene radical may be joined to other alkyl or alkylene, alkenyl, alkynyl, aryl, or heteroatom-containing substituents that, together with the benzyl radical, form the unsubstituted moiety that is pendant to the ethylenic or polyethylenic backbone. These radicals may be substituted with a hydrocarbyl radical or a heteroatom or heteroatom-containing radical or may be unsubstituted. A substituted phenyl radical has at least one radical substituted in place of at least one hydrogen atom of the phenyl radical. An unsubstituted methylene radical, for the purposes of this invention, consists of one carbon atom and two or three hydrogen atoms. A substituted methylene radical, for the purposes of this invention, consists of one carbon atom, one hydrogen atom, and at least one radical substituted in place of one of the hydrogen atoms. A benzyl radical may be bonded to the remainder of its pendant moiety through its phenyl radical. In this case, its methylene radical may be a methyl radical or a substituted methyl radical.

A heteroatom-containing radical is any radical which contains an element other than carbon and hydrogen. The heteroatom-containing radical generally improves the S oxygen-scavenging abilities of the composition. A heteroatom having pi bonds to adjacent carbon atoms is preferred. When present, the heteroatom-containing radical is preferably bonded directly to the benzyl radical with no moieties present between the heteroatom-containing radical and the benzyl radical. The heteroatom-containing radical may be bonded to the benzyl radical in any combination of three possible ways. For example, the heteroatom-containing radical may be bonded to the methylene radical. It may also be substituted onto the methylene radical in place of one of the hydrogen atoms, in which case the methylene radical is attached directly to the backbone or the moiety attached to the backbone or to another heteroatom- containing moiety. Or, the heteroatom-containing radical may be substituted in place of one of the hydrogen atoms of the phenyl radical. Examples of heteroatom-containing radicals include amine, ether, sulfide, and ketone radicals, and preferred radicals are esters and amides.

Radicals which may be substituted or joined onto the benzyl radical include alkyl radicals containing from 1 to 18 carbon atoms, alkoxy radicals having from 1 to 16 carbon atoms, alkenyl or alkynyl radicals containing from 2 to 18 carbon atoms, alkenoxy or alkynoxy radicals having from 2 to 18 carbon atoms, amine radicals having from 1 to 6 carbon atoms, aryl radicals or substituted aryl radicals having 6 to 24 carbon atoms, aryl ether radicals or substituted aryl ether radicals having from 6 to 24 carbon atoms, and ester and amide radicals of acids having from 1 to 16 carbon atoms. Aryl and aryl ether radicals can be substituted in the same manner as the methylene and the phenyl radicals, subject to the limitation that the aryl and aryl ether radicals, after substitution, have 6 to 24 carbon atoms total. Preferably, the radicals which are substituted onto the benzyl radical are selected from the group consisting of alkyl radicals containing from 1 to 6 carbon atoms, alkoxy radicals having from 1 to 6 carbon atoms, amine radicals having from 1 to 6 carbon atoms, aryl radicals and substituted aryl radicals having 6 to 15 carbon atoms, aryl ether radicals and substituted aryl ether radicals having from 6 to 15 carbon atoms, and ester and amide radicals of acids having from 1 to 6 carbon atoms. Preferred radicals which provide higher oxygen scavenging rates are alkyl, alkoxy, and amine radicals.

Preferably, the moieties which are pendant to the ethylenic or polyethylenic backbone comprise benzyl thioester, more preferably benzyl amide, and most preferably benzyl ester moieties. Preferably, the amide or ester is bonded directly to the ethylenic or polyethylenic backbone. Other preferable pendant moieties contain benzyl ether groups, benzyl amine groups, and $-CH_2$-aryl containing groups where the aryl group includes more than one ring, such as 1,3-dihydroisoindole, anthracene, phenanthrene, naphthalene and the like.

In one preferred embodiment, a polymeric composition of the present invention contains between about one and ten mole percent benzyl radicals. More preferably, the composition contains between about two and six percent, and more preferably still, between about two and three mole percent benzyl radicals. Preferably, the benzyl radicals are bonded directly to a heteroatom-containing group. The exact amount of benzyl radicals and heteroatom-containing radicals as well as the amount of transition-metal salt are normally determined by the application in which the composition is going to be employed.

In one embodiment, the specialty polymer compositions may be of low molecular-weight and have the benzylic group pendant or terminal to the ethylenic backbone. The backbone may have one ethylene unit or may be an oligomer or very low molecular weight polymer having a melt index greater than about 1000 grams per 10 minutes. Examples include benzyl, dibenzyl or tribenzyl esters or amides of $C_2$–$C_{20}$ acids, such as citric acid, ascorbic acid, stearic acid and 1,10-decanedicarboxylic acid. In another embodiment, the composition has a polyethylenic backbone having a melt index within the range of about 0.3 to about 1000 grams per 10 minutes (ASTM Method No. D-882). Preferably, the melt index is between about 0.5 and about 100, and more preferably is between about 1 and about 10 g/10 min.

2) Specialty polymers having allylic hydrogen-containing side chains

In one embodiment, a composition of the present invention comprises an ethylenic or polyethylenic backbone and moieties which contain a radical having an allylic hydrogen and which are pendant or terminal to the ethylenic or polyethylenic backbone. A pendant moiety which contains a radical having allylic hydrogen, as that term is used herein, is any group which is a side-chain or branch or is terminal to the ethylenic or polyethylenic backbone and which contains at least one allylic hydrogen.

The radical containing allylic hydrogen may be cyclic, linear, or branched, and may be unsubstituted or substituted with alkyl, aryl, or heteroatom-containing radicals, for example. The radical containing allylic hydrogen may contain more than one allylic hydrogen. Preferably, the radical contains at least four allylic hydrogen atoms. The radical may be part of an amide or ester. Examples include poly(1, 2-butadienyl) ester, Nopol ester (6,6-dimethylbicyclo[3.1.1] hept-2-ene-ethyl ester), 3-methyl-3-butenyl ester, 2,6-dimethyloct-2,6-dienyl ester, cinnamyl ester, trimethylpropane diallyl ether ester, 2,6,10-trimethyldodec-2,6,10-trienyl ester, and oleyl and/or linoleyl ester radicals.

3) Ether-containing specialty polymers

In one embodiment, a composition of the present invention comprises an ethylenic or polyethylenic backbone and hydrocarbyl moieties which contain ether and which are pendant or terminal to the ethylenic or polyethylenic backbone. A pendant moiety which contains ether, as that term is used herein, is any group which is a side-chain or branch or is terminal to the ethylenic or polyethylenic backbone and which contains at least one ether group.

The moiety containing ether may be cyclic, linear, or branched, and may be unsubstituted or substituted with alkyl, aryl, or other radicals containing a heteroatom, for example. The moiety may contain ether within its major structure, or ether may be pendant to the major structure of the moiety. The cyclic moiety may be monocyclic, or may consist of multiple rings such as benzofuran. In one embodiment, the pendant moiety is a non-cyclic ether having from 2 to 7 carbon atoms. Examples include tetrahydrofurfuryl and 2-methyltetrahydropyranyl radicals. In another embodiment, the moiety is a polyether ester moiety, such as tetrahydrofurfuryl ester, polyethyleneglycolic ester, monomethyl ether ester, and 2-methyltetrahydropyran ester.

4) Specialty polymers that contain functional side-chains

Functional additives such as antioxidants, plasticizers, UV stabilizers (screeners or absorbers), UV initiators, corrosion inhibitors, and colorants can be at least a portion of the moiety attached to the ethylenic or polyethylenic backbone. These compositions can be made by reacting a copolymer with side-chains capable of transesterifying with an alcohol of the desired additive to form a composition having an ethylenic or polyethylenic backbone and a functional side-chain that contains the desired functional additive. The melt-blend esterification and/or transesterification process described below is one method for making these compositions.

Specialty polymers that contain functional side-chains have the following advantages over blends of a polymer with the functional additives:

a) lower volatility—this results in less plate-out of the functional additive during processing and also less waste of the additive;

b) lower extractables—since the functional additive is chemically bound to the polymer instead of being blended with the polymer, less of the functional additive is extractable in FDA extraction tests or soluble in food or drinks; and/or c) lower toxicity if ingested—since high molecular-weight molecules are not absorbed by biological systems, the functional side-chains are more likely to pass through the organism without interacting with the organism's life processes.

Examples of this type of side-chain to the polyethylenic backbone include esters such as 3,5-di-t-butyl-4-hydroxybenzyl ester, esters of 2,4-dihyroxylbenzophenone, hydroxylphenylbenzotriazole, and hydroxybenzylphenone, $C_1$–$C_{18}$ alkyl ester, and the following esters and amides:

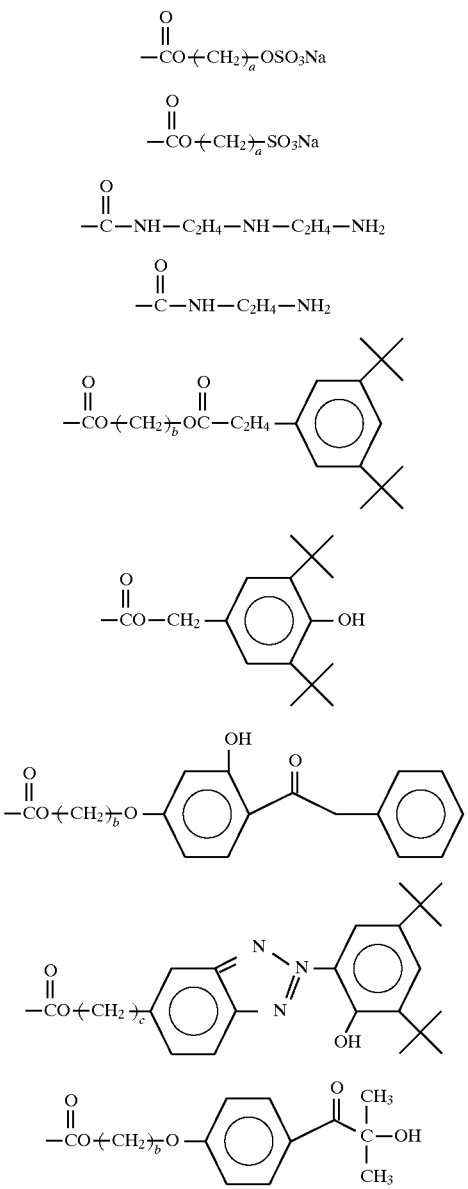

where a is an integer between 1 and 18, inclusive, b is an integer between 1 and 12, inclusive, and c is an integer between 0 and 12, inclusive.

Compositions having a polyethylenic backbone and pendant ester moieties that have an epoxy radical can be made by esterifying or transesterifying a polymer such as ethylene acrylic acid copolymer or ethylene alkyl acrylate copolymer with a compound that contains an epoxy radical. Such compounds include $C_1$–$C_{18}$ alcohols that have at least one epoxy radical substituted on a carbon atom.

In one embodiment, this invention provides a composition having a polyethylenic backbone and side-chains that contain amine, amino, and/or amide groups. The reactive extrusion process described below can be used to transesterify a copolymer such as an ethylene alkyl acrylate copolymer with hydroxyamines and polyamides that have a hydroxyl and/or amine group. Useful hydroxyamines include 2-aminoalcohols having at least one of the hydrogen atoms substituted with a $C_1$–$C_{18}$ alkyl radical and ethanolamine. The pendant moiety that is the product of transesterifying an ethylene alkyl acrylate copolymer with ethanolamine can condense to form a cyclic structure under conditions found during esterification and/or transesterification of a polymer melt, as discussed below, and the reaction product is typically a copolymer of ethylene, alkyl acrylate, and vinyl oxazoline. Polyamides, especially the condensation products of polymerizing an aminocarboxylic acid or a linear diamine and a linear carboxylic acid, can also be used to form compositions of this invention. Preferred polyamides include nylon 6 and nylon 6,6.

These compositions can be used to modify asphalt properties or to provide nylon with improved impact resistance, for example, or as intermediates to form other polymeric products.

5) Other Components in Compositions of This Invention

In a preferred embodiment, a composition of the present invention also contains an alkyl acrylate, alkyl methacrylate, acrylic acid, methacrylic acid, and/or metal salt of acrylic or methacrylic acid within the backbone. This type of composition has a polyethylenic backbone which contains pendant alkyl ester, acid, and/or metal salt of acid moieties as well as pendant benzylic, allylic, ether, and/or functional moieties discussed above. Benzylic moieties, for the purpose of this invention, consist of the benzyl radicals and substituted benzyl radicals and additionally any heteroatom-containing radicals bonded to the benzyl radicals or substituted radicals, as defined previously. Preferred alkyl acrylates are butyl and ethyl acrylate, and most preferred is methyl acrylate (MA). Preferred acrylic acids are acrylic acid and methacrylic acid. Sodium, potassium, zinc, and lithium salts of acrylic and methacrylic acid are preferred. These ester, acid, and salt moieties can provide good adhesive properties in tie layers, for example.

Additives may also be included in the composition to impart properties desired for a particular use. Such additives include, but are not necessarily limited to, fillers, pigments, dyestuffs, antioxidants, stabilizers, processing aids, plasticizers, fire retardants, anti-fogging agents, etc. The amount of these additives vary by use and typically comprise less than 10%, and preferably less than 5%, of the total weight of the composition.

B) Specialty Polymers That Scavenge Oxygen

Oxygen-scavenging compositions of this invention comprise a transition metal salt and a compound having an ethylenic or polyethylenic backbone and having pendant moieties which contain a carbon atom that can form a free radical that is stabilized by an adjacent group. The adjacent group bears the high energy of the unpaired electron through resonance structures and thereby stabilizes the free radical, so that the free radical can exist for a substantially longer time than a free radical would exist in the absence of a stabilizing group. The carbon atom that can form a free radical is bonded to an atom of the adjacent group that 1) has at least one pair of p electrons that are unbonded or that are pi-bonded to other atoms in the group, and that 2) is capable of overlapping its p orbital with the orbital of the free radical. The group can then bear the additional energy of a free electron to stabilize the free radical. The conformation of the molecule at the site of free radical formation must also be such that the orbital of the free radical is able to overlap with the p orbital of the atom in the adjacent group. Thus, a carbon atom having a hydrogen atom adjacent to a phenyl radical, an allylic radical, or a heteroatom-containing radical such as an ether-containing radical can form a free radical that is resonance-stabilized by the phenyl ring, adjacent double bond, or oxygen, respectively.

The resonance-stabilized free radical is preferably formed under oxygen scavenging conditions. A polymer is exposed to oxygen scavenging conditions when it contains a sufficient amount and type of transition metal salt to promote oxygen scavenging by the polymer, and the polymer is exposed to an oxygen-containing fluid such as air. An oxygen-scavenging composition of this invention preferably comprises a transition-metal salt and a compound having an ethylenic or polyethylenic backbone, wherein the compound has pendant or terminal moieties which contain a carbon atom that forms a resonance-stabilized free radical under oxygen-scavenging conditions. This composition typically has an instantaneous oxygen scavenging rate in air of at least about 1.0 cc of oxygen/day/g/atm. at 25° C.

In one embodiment, a composition of this invention comprises a transition-metal salt and a specialty polymer as described above. A transition-metal salt, as the term is used herein, comprises an element chosen from the first, second and third transition series of the periodic table of the elements, particularly one that is capable of promoting oxygen scavenging. This transition-metal salt is in a form which facilitates or imparts scavenging of oxygen by the composition of this invention. A plausible mechanism, not intended to place limitations on this invention, is that the transition element can readily inter-convert between at least two oxidation states and facilitates formation of free radicals. Suitable transition-metal elements include, but are not limited to, manganese II or III, iron II or III, cobalt II or III, nickel II or III, copper I or II, rhodium II, III or IV, and ruthenium. The oxidation state of the transition-metal element when introduced into the composition is not necessarily that of the active form. It is only necessary to have the transition-metal element in its active form at or shortly before the time that the composition is required to scavenge oxygen. The transition-metal element is preferably iron, nickel or copper, more preferably manganese and most preferably cobalt.

Suitable counter-ions for the transition metal element are organic or inorganic anions. These include, but are not limited to, chloride, acetate, stearate, palmitate, 2-ethylhexanoate, citrate, glycolate, benzoate, neodecanoate or naphthenate. Organic anions are preferred. Particularly preferable salts include cobalt (II) 2-ethylhexanoate, cobalt benzoate, and cobalt (II) neodecanoate. The transition-metal element may also be introduced as an ionomer, in which case a polymeric counter-ion is employed. Such ionomers are well known in the art. See U.S. Pat. No. 3,264,272, which is incorporated by reference in its entirety.

The composition of the present invention contains a sufficient quantity of the transition-metal salt to promote oxygen scavenging in the polymer. Generally, this requires a ratio of moles of free radical-generating carbon atoms to moles of transition-metal element between about 2000:1 to about 10:1. Preferably, this molar ratio is between 200:1 and 20:1. The type and amount of transition-metal salt are selected to give an instantaneous oxygen scavenging rate in the polymer of at least about 1.0 cc oxygen per gram of oxygen-scavenging composition per day in air at 25° C. at 1 atmosphere pressure, and preferably the amount and type of transition-metal salt are selected to give an instantaneous oxygen scavenging rate of at least about 5 cc $O_2$ per g of oxygen-scavenging composition per day in air at 25° C. at 1 atm. pressure after the induction period ends. The preferred amount of transition-metal element will typically vary with which transition-metal salt is used. Oxygen-scavenging compositions of this invention can sustain their mechanical properties over greater periods of time than other oxygen-scavenging compositions such as polybutadiene, which contain oxidation sites in the backbone and/or immediately adjacent to the backbone. Oxygen-scavenging compositions of this invention are easily processed by conventional equipment and can be blended or coextruded with a wide range of polymers. Also, it has been found that many of the oxygen scavenging compositions of this invention, particularly ester and amide oxygen scavengers, do not require added photo-initiators when exposing them to UV light to reduce their oxygen-scavenging induction period.

1) Benzylic oxygen-scavenging specialty polymers

In one embodiment, this invention provides compositions effective to scavenge oxygen comprising a transition metal salt and a component having an ethylenic or polyethylenic backbone and having pendant or terminal moieties which contain a benzyl radical, wherein the benzyl radical has at least one hydrogen on its methylene radical and/or on a carbon atom alpha to the phenyl radical. This component is preferably a benzylic specialty polymer, as described above, with the proviso that the its benzyl radical has at least one hydrogen alpha to the phenyl ring. Preferably, the benzyl radical is bonded directly to a heteroatom such as oxygen or nitrogen. Preferred benzyl radicals are benzyl ester and benzyl amide radicals.

Without limiting the invention to this theory, it is postulated that the transition metal element catalyzes a reaction between the benzyl radicals in the pendant moieties and oxygen. In one preferred embodiment, this reaction results in scission of the bond between the methylene radical of the benzyl radical and the heteroatom-containing radical. This reaction forms a separate compound, a benzoic acid, a salt of a benzoic acid, or a substituted benzoic acid or salt. Preferably, benzoic acid is formed, which is listed by the FDA as a compound generally regarded to be safe for human consumption in limited quantities.

It is postulated that the primary function of the benzyl radicals is to react irreversibly with oxygen during the scavenging process. The primary function of the transition-metal salt is to facilitate this process. Thus, to a large extent, the quantity of benzyl radicals and the amount of transition-metal salt will affect the rate at which oxygen is consumed. Thus, the quantities of benzyl radicals and transition-metal salt are selected in accordance with the scavenging rate and capacity needed.

The exact amount of benzyl radicals and heteroatom-containing radicals as well as the amount of transition-metal salt are normally determined by the application in which the composition is going to be employed. It is expected that an oxygen-scavenging composition having primarily benzyl ester radicals as the scavenging moieties will be especially useful for food applications. The primary oxidation product which is freed from the polymer backbone when oxygen reacts with the polymer is a benzoic acid which, in certain quantities, is FDA-approved for addition to foods.

Preferred polymers used in the oxygen-scavenging compositions of the present invention comprise ethylene alkyl acrylate copolymers which have been reacted with benzyl alcohol or benzyl amine to form an ethylene benzyl acrylate or an ethylene benzyl acrylamide polymer. These polymers are typically made by transesterification or transamidation as described below. A particularly preferred polymer intermediate for making these oxygen-scavenging compositions is ethylene methyl acrylate copolymer. A composition of the present invention made from ethylene-methyl acrylate copolymer having 40 weight percent methyl acrylate can have from about 0.33 to about 17.85 mole percent of the scavenging moieties. Ethylene methyl acrylate copolymer which has 24 weight percent methyl acrylate can have from about 0.33 to about 9.33 mole percent of the scavenging moieties. Preferably, reacted ethylene methyl acrylate copolymer will have between about 1 and 10 mole percent, more preferably between about 2 and 6 mole percent, and more preferably still, between about 2 and 3 mole percent of the scavenging moieties. It is often desirable to have partial transesterification or transamidation, thereby leaving some of the alkyl acrylate moieties unreacted, so that the polymer properties can be tailored to the particular application. The physical properties of the reacted polymers are similar to the physical properties of unreacted alkyl acrylate copolymer. As a result, a composition of the present invention using ethylene-methyl acrylate copolymer to form an ethylene benzyl acrylate or ethylene methyl acrylate benzyl acrylate terpolymer is optically clear and has similar processing characteristics to ethylene-methyl acrylate copolymer. Ethylene-methyl acrylate copolymer which has been partially transesterified to form an ethylene methyl acrylate benzyl acrylate terpolymer (about 76.6/14.4/9 wt. %, respectively) and which contains about 1000 ppm cobalt in the form of cobalt neodecanoate is a particularly preferred composition of the present invention.

In another preferred embodiment, the oxygen scavenging compositions of the present invention utilize a polymer prepared by reacting an ethylene alkyl acrylate copolymer, or an ethylene methyl methacrylate copolymer, with a benzylic amine or alcohol of Formula (VIII).

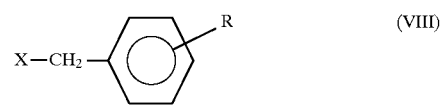

(VIII)

In Formula (VIII), X is NH$_2$ or OH, and R is independently selected from the group consisting of hydrogen, phenyl, alkyl radicals containing from 1 to 18 carbon atoms, alkoxy radicals having from 1 to 16 carbon atoms, amine radicals having from 1 to 6 carbon atoms, aryl radicals and substituted aryl radicals having 6 to 24 carbon atoms, aryl ether radicals and substituted aryl ether radicals having from 6 to 24 carbon atoms, and ester and amide radicals of acids having from 1 to 16 carbon atoms. X is preferably NH$_2$ or OH, and R is preferably methyl or methoxy, and more preferably is H. The amine is preferably benzyl amine, and the alcohol is preferably benzyl alcohol. Mixtures of benzylic alcohols and benzylic amines can also be used.

Among other factors, it has been found that these polymers are surprisingly good oxygen scavengers when combined with a transition metal salt, such as an organic cobalt salt. Moreover, the oxygen scavenging capacity and other physical properties of these polymers can be readily varied by selecting the amount of alkyl acrylate in the copolymer reactant and the quantity of benzylic amine or alcohol used in the reaction.

When a benzylic alcohol is the reactant, an especially useful composition of this invention contains between 1 and 10 mole %, and preferably between 2 and 6 mole %, of the benzylic structure of Formula (IX).

(IX)

Preferred polymers are poly(ethylene—methyl acrylate—benzyl acrylate) terpolymers, and poly (ethylene—methyl acrylate—benzyl-acrylamide) terpolymers.

2) Oxygen-scavenging specialty polymers containing allylic side-chains

In one embodiment, this invention provides compositions effective to scavenge oxygen comprising a transition metal salt and a component having an ethylenic or polyethylenic backbone and having pendant moieties which contain a radical having allylic hydrogen. This component is preferably a specialty polymer having an allylic side-chain, as described above. Examples 45–47 illustrate the capabilities of these oxygen-scavenging compositions.

It is expected that, as the side-chain containing allylic hydrogen oxidizes, the ethylenic or polyethylenic backbone remains intact for a longer period of time than when the point of unsaturation is located in or immediately adjacent to the backbone, as it is in polybutadiene alone. Since the backbone remains intact longer, the mechanical properties are maintained over a longer period of time than when polybutadiene alone is oxidized.

In one embodiment, this invention provides compositions effective to scavenge oxygen comprising a transition metal salt and a component having an ethylenic or polyethylenic backbone and having pendant moieties, wherein each moiety contains at least four allylic hydrogen atoms. This composition scavenges oxygen rapidly and has high oxygen-scavenging capacity.

In another embodiment, this invention provides compositions effective to scavenge oxygen comprising a transition metal salt and a component having an ethylenic or polyethylenic backbone and having pendant moieties which contain a cyclic radical containing allylic hydrogen. A cyclic radical containing allylic hydrogen does not include an aromatic radical where the cyclic portion of the radical is solely aromatic.

Examples of pendant moieties which contain allylic hydrogen include poly(1,2-butadienyl) ester, Nopol ester (6,6-dimethylbicyclo[3.1.1]hept-2-ene-ethyl ester), 3-methyl-3-butenyl ester, 2,6-dimethyloct-2,6-dienyl ester, cinnamyl ester, trimethylpropane diallyl ether ester, 2,6,10-trimethyldodec-2,6,10-trienyl ester, and oleyl and/or linoleyl ester radicals. Oxygen-scavenging specialty polymers containing allylic hydrogen side chains, especially side chains having cyclic moieties that contain allylic hydrogen, scavenge oxygen effectively at typical refrigeration temperatures (about 4° to 6° C.).

3) Ether-containing oxygen-scavenging specialty polymers

In one embodiment, this invention provides compositions effective to scavenge oxygen comprising a transition metal salt and a component having an ethylenic or polyethylenic backbone and having pendant ether moieties which have at least one hydrogen on a carbon atom adjacent to the ether radical. This component is preferably an ether-containing specialty polymer, as described above, or a polymer having an ethylenic or polyethylenic backbone and pendant diallylic ether or diallylic ether ester moieties, where there is at least one hydrogen on a carbon atom adjacent to the ether radical. Example 46 illustrates the capabilities of these oxygen-scavenging compositions.

Preferably, the pendant radical is a cyclic ether, especially a cyclic ether having from 2–7 carbon atoms. The cyclic moiety may be mono-cyclic, or may consist of multiple rings. Examples of suitable pendant radicals include tetrahydrofurfuryl, 2-methyltetrahydropyranyl, polyether, polyethyleneglycolic, and monomethyl ether.

4) Additive for oxygen-scavenging specialty polymers

One additive that may be included in any of the oxygen-scavenging compositions above is a photoinitiator, which acts to reduce the induction period of many oxygen scavenging compositions. See U.S. Pat. No. 5,211,875, which discusses photoinitiators and which is incorporated by reference in its entirety.

C) Methods of Making Compositions of This Invention

Compositions of this invention can be made by many means. Monomers containing benzyl, allylic, and/or heteroatom-containing radicals can be oligomerized or polymerized alone or with comonomers such as ethylene, propylene or other olefins, and other comonomers such as (meth)acrylic acid and alkyl (meth)acrylate to provide an ethylenic or polyethylenic backbone after polymerization. Methods for this type of polymerization are well-known in the art and include solution, slurry, or gas-phase polymerization in the presence of a catalyst, such as a free radical catalyst, a Ziegler Natta catalyst, or a metallocene polymerization catalyst.

A preferred way to make compositions of this invention is to produce a polymer intermediate and react the intermediate with a modifying compound to form a polymer with a polyethylenic backbone and with pendant benzyl, allylic, and/or heteroatom-containing moieties. When making an oxygen-scavenging composition in this manner, the transition-metal salt can be incorporated into the composition before, during, or after reacting the polymer intermediate with the modifying compound.

There are many types of polymer intermediates which are useful in making compositions of the present invention. For example, an alkyl methacrylate can be homopolymerized by way of addition polymerization to form a polymer having an ethylenic or polyethylenic backbone with pendant methyl groups and with pendant alkyl ester groups. Copolymerization of ethylene with an alkyl acrylate or methacrylate also forms a useful polymer intermediate. One preferred copolymer is ethylene methyl acrylate copolymer, sold by Chevron Chemical Company as EMAC® copolymer.

High melt-point ethylene-alkyl acrylate copolymers are also useful polymer intermediates. These copolymers have a melt-point temperature at least about 6 deg F. greater than a reference ethylene-alkyl acrylate copolymer, where the reference copolymer is made in a multi-zone autoclave reactor and the ratio of alkyl acrylate to ethylene in a reaction zone when making the reference copolymer is about equal to the overall ethylene to alkyl acrylate ratio fed to the multi-zone autoclave reactor. A high melt-point ethylene-methyl acrylate copolymer typically has a melt-point temperature greater than the value obtained from the expression:

$$\text{temperature (deg F)} = 248 - 2.9Y$$

where Y is the weight percent of methyl acrylate in the high melt-point ethylene-methyl acrylate copolymer and where Y is greater than 10. Similarly, a high melt-point ethylene-butyl acrylate copolymer typically has a melt-point temperature greater than the value obtained from the expression:

$$\text{temperature (deg F)} = 240 - 2.1Z$$

where Z is the weight percent of butyl acrylate in the high melt-point ethylene-butyl acrylate copolymer and where Z is greater than 15. High melt-point ethylene-alkyl acrylate copolymers can be made by a process comprising:

1) feeding overall an amount by weight, A, of alkyl acrylate and an amount by weight, E, of ethylene to a multi-zone autoclave polymerization reactor;
2) introducing an effective amount of an initiator and at least a portion, $E_1$, of the total amount of ethylene into a first reaction zone of the reactor;

3) concurrently introducing a portion, $A_1$, of alkyl acrylate to said first reaction zone such that the ratio $A_1/E_1$ is at least about 20% more than or is at least about 20% less than the ratio A/E for the reactor overall; and 4) feeding any remaining portions of initiator, ethylene and alkyl acrylate to a subsequent reaction zone or zones.

High melt-point ethylene-alkyl acrylate copolymers are disclosed in U.S. Ser. Nos. 07/764,861, filed Sep. 24, 1991, 07/947,870, filed Sep. 21, 1992, and 08/233,180, filed Apr. 26, 1994, which are incorporated by reference herein in their entirety.

Other useful polymer intermediates include ethylene alkyl acrylate ionomer, ethylene acrylic acid copolymer, ethylene acrylic acid ionomer, and ethylene vinyl acetate copolymer. Yet another polymer intermediate is a polyethylenic-backbone polymer containing maleic anhydride moieties. For example, Lotader, a product of ELF Atochem, contains ethylene, alkyl acrylate and maleic anhydride moieties in which the unsaturated carbon atoms of maleic anhydride become saturated carbon atoms within the polyethylenic backbone. Alternatively, maleic anhydride may be grafted to a polymer having a polyethylenic backbone by, for example, free-radical grafting. Methods for making these polymers are well-known in the art. See, for example, U.S. Pat. No. 4,506,056, which is incorporated by reference in its entirety. An ester, acid, acetate, or anhydride in the moieties pendant to the polyethylene backbone is then reacted with a compound to form a composition of this invention or a polymer useful in the compositions of this invention.

The modifying compound which is reacted with the polymer intermediate is selected on the basis of its reactivity with the particular polymer intermediate and on the basis of whether the polymer resulting from the reaction contains a benzyl, allylic, and/or heteroatom-containing radical. The benzylic, allylic, or ether-containing compound may be substituted or unsubstituted, as discussed previously, and may also contain a heteroatom to enhance any oxygen-scavenging activity desired from the benzyl, allylic, or heteroatom-containing moiety. In a preferred embodiment of this invention, a polymer intermediate having pendant methyl acrylate moieties, ethylene-methyl acrylate copolymer, is transesterified with benzyl alcohol to form pendant benzyl acrylate moieties. Likewise, in another preferred embodiment, ethylene- methyl acrylate copolymer is transamidated with benzyl amine to form pendant benzylamide moieties. Benzyl alcohol is available from Akzo Chemical Company, and benzyl amine is available from Spectrum Chemical Company. In these cases, the important feature of the benzylic compound is that it is capable of esterification, transesterification, amidation, or transamidation under conditions sufficient to promote such reactions. Other preferred modifying compounds include the transesterifying compounds listed in Tables 3 and 4.

Imidation (the reaction of an anhydride with a primary amine to form an imide), esterification, transesterification, or transamidation may be performed in an autoclave. Reaction conditions will vary, depending on the reactants. A transesterification or transamidation catalyst may be used. For a polymer intermediate having alkyl acrylate or methacrylate pendant moieties, typically the reaction will be performed at a temperature between 180° and 300° C. and at a pressure of between 50 and 1000 psi for a period of time between ½ and 8 hours. Preferably, the reaction will be performed at a temperature between 200° and 240° C. and at a pressure of between 100 and 600 psi for a period of time between 1 and 5 hours where ethylene-methyl acrylate copolymer is reacted with benzyl amine. This produces a polymer containing pendant moieties comprising benzyl radicals. Amidation of an acid or transamidation may also be performed using reactive extrusion, as discussed below.

Esterification, transesterification, transamidation, or imidation may also be performed by dissolving an ethylenic or polyethylenic component such as a polymer in a solvent and heating the component, the modifying compound (ex. benzyl amine or benzyl alcohol), and optionally the transesterification or transamidation catalyst at reflux conditions. The conditions can vary, depending on the particular composition sought. Typically the reaction will be performed at a temperature between 130° and 240° C. for a period of time between ½ and 16 hours. Preferably, the reaction will be performed at a temperature between 160° and 200° C. for a period of time between 1 and 8 hours where ethylene-methyl acrylate copolymer is reacted with benzyl alcohol. This also produces a polymer containing pendant moieties comprising benzyl radicals. This method is useful for esterifying low molecular-weight acids with a benzylic alcohol. Esterification or transesterification can be facilitated by use of transesterification catalysts, which are well-known in the art. Suitable transesterification catalysts include strong non-oxidizing acids, Group I alkoxides, and Group IVB alkoxides, such as di-butyl tin dilaurate, sodium methoxide, toluene sulfonic acid, tetrabutyl titanate, tetraisopropyl titanate, and tetraethyl titanate, with tetraalkyl titanate being particularly preferred. Sodium hydroxide may also be used. Titanate catalysts are available from Hüls America.

Likewise, transamidation can be facilitated by use of transamidation catalysts, which are well-known in the art. Suitable transamidation catalysts include 2-hydroxy pyridine and sodium methoxide, with 2-hydroxy pyridine being particularly preferred. These catalysts are available from Aldrich.

D) Esterification or Transesterification of a Polymer Melt

A particularly preferred method of making ester or imide compositions of the present invention is through esterification and/or transesterification of a polymer melt. In this process, a composition of the present invention or preferably the ethylenic or polyethylenic component of a composition of the present invention is made by melt- blending a polymer intermediate with a benzylic, allylic, or heteroatom-radical-containing compound (such as an alcohol or amine of these radicals) and, optionally, with the transesterification and/or transamidation catalyst and, also optionally, the transition-metal salt. Reaction conditions are chosen to promote esterification, transesterification and/or imidation. These reactions will normally occur in the presence of a suitable catalyst. The resulting polymer can be extruded into any convenient form, such as pellets or film. The esterification and transesterification process is discussed in further detail below.

1) The polymer to be transesterified

The polymer to be transesterified, also referred to herein as an ethylene copolymer, has a polyethylenic backbone and pendant ester and/or acid moieties. This polymer has a melt index within the range of about 0.3 to about 1000 grams per 10 minutes (ASTM Method No. D-882). Preferably, the melt index is between about 0.5 and about 100, and more preferably is between about 1 and about 10 g/10 min.

The ethylene copolymer also contains ester and/or acid groups or radicals which are pendant to the polyethylenic backbone. A pendant moiety which contains an ester or acid radical is any group which is a side-chain or branch to the polyethylenic backbone and which contains an ester radical, an acid radical, or a radical that can be considered to be equivalent to an acid, such as an anhydride. In Formula (I) above, the moieties X and Y are pendant moieties.

The hydrocarbyl radical on the ester is one which is capable of being esterified and/or transesterified under esterification or transesterification conditions by the transesterifying compound and the optional transesterification catalyst(s). The ester radical may have a hydrocarbyl radical that is substituted with a heteroatom or a heteroatom-containing radical. A heteroatom is an element other than carbon and hydrogen. Examples of a substituted hydrocarbyl radical on unreacted ethylene copolymers are methoxy ethyl and mono-methoxy polyethylene glycol. The ester radical preferably has an unsubstituted hydrocarbyl radical. An unsubstituted hydrocarbyl radical for the purposes of this invention includes a $C_1$–$C_{18}$ alkyl, preferably $C_1$–$C_4$ alkyl, and more preferably a methyl radical.

In one embodiment, the polymer to be esterified and/or transesterified is a homopolymer, such as poly(methyl methacrylate). In another embodiment, the polymer to be esterified and/or transesterified is a copolymer of styrene and methyl methacrylate or poly(methyl methacrylate). The polymer to be esterified and/or transesterified is a polymer having the structure of Formula I above, where the substituent "Y" is an acid or ester.

In a preferred embodiment, the ethylene copolymer to be esterified and/or transesterified contains a major portion of ethylene. Typically, the ethylene copolymer contains from about 83 to about 99 mole percent ethylene, based on all comonomers present in the polymer. Preferably, the polymer contains about 90.7 to 98 mole percent, and more preferably, contains 93 to 97 mole percent ethylene.

In one preferred embodiment, the polymer to be esterified and/or transesterified is an ethylene alkyl acrylate copolymer. As used herein, the term "ethylene alkyl acrylate copolymer" also includes ethylene-alkyl methacrylate copolymer and ethylene-alkyl acrylate-alkyl methacrylate copolymer. Ethylene-alkyl acrylate copolymers and methods of making them are well-known in the art. Particularly preferred is ethylene-methyl acrylate copolymer. High melt-point ethylene-alkyl acrylate copolymers are also useful polymer intermediates.

In another preferred embodiment, the polymer to be esterified and/or transesterified is an ethylene vinyl acetate copolymer, an ethylene acrylic acid copolymer or an ethylene copolymer containing pendant groups which are equivalent to acid moieties, such as anhydrides.

The ethylene copolymer may optionally contain other comonomers which, when present in the polymer, do not interfere with the esterification and/or transesterification reaction. The optional comonomers may react with the transesterifying compound, but interference for the purposes of this invention occurs when less than 5% of the ester or acid moieties in the polymer that would have otherwise transesterified if the optional comonomer was not present transesterify in the presence of a stoichiometric excess of transesterifying compound because of the presence of the optional comonomer.

One example of an ethylene copolymer having other comonomers which do not interfere with the transesterification reaction is a partially saponified ethylene alkyl acrylate copolymer. Sodium, lithium, or potassium ionomers of an ethylene alkyl acrylate copolymer are described in U.S. Ser. No. 08/144,173, filed Oct. 27, 1993, which is incorporated by reference in its entirety. Preferred is ethylene-methyl acrylate-sodium acrylate copolymer having between about 1 and about 17 mole percent methyl acrylate and about 1 and about 9 mole percent sodium acrylate. Another example is Lotader, a product of ELF Atochem, which is an ethylene alkyl acrylate copolymer which contains maleic anhydride moieties whose unsaturated carbon atoms became saturated carbon atoms within the polyethylenic backbone. Alternatively, maleic anhydride may be grafted to a polymer having a polyethylenic backbone by, for example, free-radical grafting. Methods for making these polymers are well-known in the art. See, for example, U.S. Pat. No. 4,506,056, which is incorporated by reference in its entirety.

2) The transesterifying compound

The term "transesterifying compound" includes compounds which transesterify with a second compound as well as compounds which esterify a second compound. The transesterifying compound is selected from compounds having the ability to participate in an esterification or transesterification reaction for the particular ethylene copolymer chosen for the reaction. The transesterifying compound may itself be a polymer that is capable of supplying a hydrocarbyl radical to the ethylene copolymer chosen for transesterification. In this way, hydrocarbyl groups may be interchanged between the two polymers, or the two polymers may become cross-linked with one another.

When the ethylene copolymer is an ethylene alkyl acrylate copolymer or an ethylene acrylic acid copolymer, the transesterifying compound may be an alcohol, diol, polyol, ether-ol, ene-ol, polyethylene glycol, hydroxyl amine, hydroxyl-terminated polycarbonate or hydroxyl-containing asphalt. Alcohols are preferred transesterifying compounds for these copolymers. The alcohol is preferably a primary or secondary alcohol. Benzyl alcohol is particularly preferred when making adhesives and oxygen scavenging compounds. Other preferred alcohols are listed in Tables 3, 4, and 5.

When the ethylene copolymer is an ethylene vinyl acetate copolymer, the transesterifying compound may be an organic acid, such as $C_1$–$C_{16}$ acid, $C_1$–$C_{12}$ diacid and triacid, for example, oleic acid, stearic acid, benzoic acid and citric acid. Phenyl acetic acid is particularly preferred. However, the transesterifying compound for an ethylene vinyl acetate copolymer is not an alcohol or other compound which removes the carboxy radical from the ethylene copolymer, resulting in an ethylene vinyl alcohol copolymer. It is an essential feature of this process that the polymer have a polyethylenic backbone and pendant ester moieties after transesterification.

The hydrocarbyl radical of the transesterifying compound includes alkyl radicals containing from 1 to 18 carbon atoms, alkoxy radicals having from 1 to 16 carbon atoms, alkyl ether radicals having from 2 to 18 carbon atoms, alkenyl and alkynyl radicals containing from 2 to 18 carbon atoms, alkenoxy and alkynoxy radicals having from 2 to 16 carbon atoms, alkenyl and alkynyl ether radicals having from 3 to 18 carbon atoms, amine radicals having from 1 to 16 carbon atoms, acid and metal salt of acid radicals, anhydride radicals having from 4 to 24 carbon atoms, ester and amide radicals of acids having from 1 to 16 carbon atoms, aryl radicals and substituted aryl radicals having 6 to 24 carbon atoms, and aryl ether radicals and substituted aryl ether radicals having from 6 to 24 carbon atoms.

The hydrocarbyl radical of the transesifying compound may be a hydrocarbyl radical or may be a hydrocarbyl radical substituted with a heteroatom or a heteroatom-containing radical. The hydrocarbyl radical may therefore also contain halogen, acetyl, nitro, or nitrile moieties, for example.

The amount of transesterifying compound used in the transesterification reaction is typically between about 0.05 mole of hydrocarbyl radical from the transesterifying compound per mole of ester on the ethylene copolymer to 2 moles per mole. Preferably, the amount of transesterifying compound is at or slightly in excess of the stoichiometric amount required to obtain the desired extent of transesterification of acid and/or ester moieties. Some transesterifying compounds such as hexadecanol are solid, although the transesterifying compounds are usually liquids at the temperature at which the transesterification reaction occurs. A solid compound may be fed to the process neat, or it may be fed to the process in a suitable solvent, so long as the compound is mixed uniformly in the melt. The amount of liquid fed to the process is preferably minimized so that downstream processing to remove the liquid is not required. A transesterifying compound with a low boiling-point may require that the process operate at a pressure above atmospheric to prevent the transesterifying compound from boiling prior to esterifying or transesterifying the polymer. When the process is used to make an oxygen-scavenging composition, an electron-donating group such as a heteroatom or heteroatom-containing radical generally improves the oxygen-scavenging abilities of the composition. The ester or amide group on the polymer may supply the heteroatom, or the heteroatom-containing radical may be an ether. When present, the heteroatom or heteroatom-containing radical is preferably bonded directly to the atom on the hydrocarbyl radical at which the oxygen to be scavenged reacts.

One oxygen scavenging composition which is preferred is an ethylene-benzyl ester copolymer. In this case, the heteroatom-containing radical may be bonded to the benzyl radical in any of three possible ways. The heteroatom-containing radical may be bonded to the methylene radical of the benzyl moiety. It may also be substituted onto the methylene radical in place of one of the hydrogen atoms, in which case the methylene radical is attached directly to the backbone or the moiety attached to the backbone or to another heteroatom-containing moiety. Or, the heteroatom-containing radical may be substituted in place of one of the hydrogen atoms of the phenyl radical. Examples of heteroatom-containing radicals include amine, ether, sulfide, and ketone radicals, and preferred radicals are esters and amides. Aryl and aryl ether radicals can be substituted in the same manner on the methylene and the phenyl radicals, subject to the limitation that the aryl and aryl ether radicals, after substitution, have 6 to 24 carbon atoms total. Preferably, the radicals which are substituted onto the benzyl radical are selected from the group consisting of alkyl radicals containing from 1 to 6 carbon atoms, alkoxy radicals having from 1 to 6 carbon atoms, amine radicals having from 1 to 6 carbon atoms, aryl radicals and substituted aryl radicals having 6 to 15 carbon atoms, aryl ether radicals and substituted aryl ether radicals having from 6 to 15 carbon atoms, and ester and amide radicals of acids having from 1 to 6 carbon atoms. Preferred radicals which provide higher oxygen scavenging rates are alkyl, alkoxy, and amine radicals that are bonded to the methylene radical of the benzyl moiety, or that are bonded in the ortho and/or para position on the phenyl moiety.

3) Transesterification process

Esterification or transesterification of the polymer melt can occur in many types of equipment. A Banbury mixer or other mixing equipment capable of forming a polymer melt may be used.

In a preferred process, a melt of a polymer having a polyethylenic backbone and pendant ester moieties is mixed with a transesterifying compound and, optionally, a transesterification catalyst and/or an oxygen scavenging-promoting transition-metal salt in an extruder. Reaction conditions are chosen to promote esterification and/or transesterification. Esterification or transesterification preferably occurs using a transesterification catalyst. The resulting polymer can be extruded into any convenient form, such as pellets or film, and may be exposed to actinic radiation.

A melt-blend is preferably made by introducing solid ethylene copolymer (such as ethylene-methyl acrylate copolymer pellets) into an extruder at a temperature and mixing time sufficient to melt the polymer and blend it with the transesterifying compound and any catalysts and transition-metal salts which are optionally introduced into the extruder. A melt may also be formed outside the extruder and fed into the extruder or other mixing equipment used for the esterification and/or transesterification reaction. The appropriate temperature for melt-blending is within the temperature range established by the melting temperature of the polymer (i.e. the temperature at which the polymer is readily deformed; generally, a molten or fluid state) and the temperature at which the polymer starts to degrade. Typically, the temperature is between 180° and 250° C. The blend time, which is the length of time required to mix or blend the polymer, transesterifying compound, and optional catalyst and transition-metal salt, is chosen to provide good mixing and significant reaction of the transesterifying compound with the polymer. Typically, the blend time is between 5 seconds and 2 minutes in the extruder. Little or no solvent is used beyond that amount needed to assure good contact of the transesterifying compound with the melt. Alcohols and organic acids typically are liquids at reaction conditions, so no solvent is necessary for these transesterifying compounds. The transesterification reaction can proceed without using a polymer solvent, since the polymer melt and intensive mixing supplied by the mixing equipment provide sufficient contact between the polymer and the transesterifying compound.

The degree of reaction of the ethylene copolymer is preferably based on the amount of transesterifying compound added. Preferably, the transesterifying compound completely reacts with the polymer, so that excess transesterifying compound does not have to be removed in further processing steps.

Esterification or transesterification can be facilitated by use of the transesterification catalysts discussed above. The amount used is that amount which facilitates esterification or transesterification without adversely affecting other polymer properties to a substantial degree. In the case of alkoxy titanates, an alcohol/catalyst molar ratio of 100/3 to 100/0.1 is preferred. Catalysts can be introduced into the mixing equipment separately from the other feed components or mixed with one of the other feed components.

An extruder for this invention is preferably an intermeshing twin-screw extruder. Uniform and intensive mixing such as that supplied by kneading blocks and right-hand elements is particularly preferred. See U.S. Ser. No. 08/144,173, filed Oct. 27, 1993, in this regard.

An extruder may be used in series with one or more extruders or with other processing equipment. When one extruder is used, it is typically divided into at least two zones, a reaction zone and a devolatilization zone. The pressure in the reaction zone is typically selected on the basis of the vapor pressure or boiling point of the transesterifying compound used, and can be at essentially atmospheric pressure for many transesterifying compounds. The reaction zone may also be under slight pressure due to the heat and extruder's action on the polymer. The devolatilization zone is typically under vacuum to assist removing volatile materials from the transesterified polymer.

A preferred embodiment of the process of this invention comprises forming a melt of a polymer capable of esterification and/or transesterification and blending the melt with a hydroxy form of a functional additive under esterification and/or transesterification conditions provides an efficient and economical method of making a polymer having functional side-chains. The hydroxy form of a functional additive has at least one hydroxyl group that can esterify an acid group on the polymer to be esterified (for example, ethylene acrylic acid) or transesterify an ester group on the polymer to be transesterified (for example, ethylene methyl acrylate copolymer).

Compositions of this invention or polymers useful in forming compositions of this invention may contain acrylic acid and/or alkyl acrylate pendant moieties. These can be partially or completely neutralized and/or saponified by methods well-known in the art of making ionomers. One such method is disclosed in U.S. Ser. No. 08/144,173, filed Apr. 5, 1994, which is incorporated by reference herein in its entirety.

When the process of this invention is used to make an oxygen-scavenging polymer, an oxygen scavenging-promoting transition-metal salt may be added into the polymer during the esterification or transesterification reaction. Alternatively, the transition metal salt can be incorporated into the polymer component by, for instance, coating pellets of the esterified or transesterified ethylene copolymer with the transition-metal salt and melt-blending the pellets in an extruder, thereby incorporating into the melt blend an amount of the transition-metal salt that is effective to catalyze oxygen scavenging. The method of incorporating the transition-metal salt into the composition is not critical, as long as the transition-metal salt is dispersed throughout the composition prior to use of the composition as an oxygen scavenger. The transition-metal salt can be incorporated into the composition before, during, or after transesterification.

Optionally, the compositions and process of this invention can include exposure of the polymer containing the oxygen scavenging-promoting transition metal to actinic radiation to reduce the induction period, if any, before oxygen scavenging commences. U.S. Pat. No. 5,211,875, which is incorporated by reference in its entirety, discloses a method for initiating oxygen scavenging by exposing a film comprising an oxidizable organic compound and a transition metal catalyst to actinic radiation. A composition of the present invention which has a long induction period in the absence of actinic radiation but a short or non-existent induction period after exposure to actinic radiation is particularly preferred. Compositions which are activated by actinic radiation can be stored without special preparation or storage requirements, such as being packaged or kept in a nitrogen environment. They maintain a high capability for scavenging oxygen upon activation with actinic radiation. Thus, oxygen scavenging can be activated when desired.

The radiation used can be actinic, e.g., ultraviolet or visible light having a wavelength of about 200 to 750 nanometers (nm), and preferably having a wavelength of about 200 to 400 nm. When employing this method, it is preferable to expose the composition to at least 0.01 Joules per gram of composition of this invention. A typical amount of exposure is in the range of 0.1 to 100 Joules per gram. Other sources of radiation include ionizing radiation such as gamma, x-rays and corona discharge. The duration of exposure depends on several factors including, but not limited to, the amount and type of photoinitiator present, thickness of the layers to be exposed, amount of any antioxidant present, and the wavelength and intensity of the radiation source.

Preferred compositions of the present invention do not require a photoinitiator.

A) Uses for Compositons of This Invention

1) Uses for the specialty polymers

There are many uses for the specialty polymers discussed above. Among other uses, they may be used as a mono-layer film or as a tie layer in a multi-layer film construction for packaging. In certain embodiments, films of the specialty polymers above have substantially increased oxygen permeability, making them useful for packaging fresh-cut produce. Specialty polymers may be used as a heat seal layer or protective layer in packaging, or may be used as an asphalt additive, a hot melt adhesive, a coating, or as wire insulation. Specialty polymers may also be used in injection molding, vacuum molding, or thermoforming applications. Many of the specialty polymers above can be used to modify the physical and performance properties of polymers in which the specialty polymer is blended. Examples of polymers with which the specialty polymers above may be blended include: polyethylene; polypropylene; ethylene-propylene-butadiene terpolymer; ethylene-alkyl acrylate copolymers such as ethylene-methyl acrylate copolymer, ethylene-ethyl acrylate copolymer, and ethylene-butyl acrylate copolymer; ethylene-vinyl acetate copolymer; ethylene-vinyl alcohol copolymer; polyesters such as poly(ethylene terephthalate); nylon; modified polyethylene (ex. maleic anhydride-grafted polyethylene); polybutene; ethylene-propylene copolymer; and other thermoplastic polyolefins.

2) Uses for the oxygen-scavenging compositions of the present invention

Oxygen-scavenging compositions of the present invention are useful in many ways. They can be processed into the form of high surface-area fibers for removing oxygen which contacts the fibers. The compositions can be dispersed as small particles for absorbing oxygen or can be coated onto materials such as metallic foil, polymer film, metalized film, or cardboard to provide, in some embodiments, scavenging properties and/or adhesive properties. The compositions are also useful in making articles such as single or multi-layer rigid thick-walled plastic containers (typically, between 8 and 100 mils in thickness) or in making single or multi-layer flexible films, especially thin films (less than 3 mil, or even as thin as about 0.25 mil). Some of the compositions of the present invention are easily formed into films using well-known means. These films can be used alone or in combination with other films or materials.

The compositions of the present invention may be further combined with one or more polymers, such as thermoplastic polymers which are typically used to form film layers in plastic packaging articles. In the manufacture of certain packaging articles, well-known thermosets can also be used as a polymeric diluent.

Selecting combinations of a diluent and the composition of the present invention depends on the properties desired. Polymers which can be used as the diluent include, but are not limited to, polyethylene, low or very low density polyethylene, ultra-low density polyethylene, linear low density polyethylene, polypropylene, polyvinyl chloride, and ethylene copolymers such as ethylene-vinyl acetate, ethylene-alkyl acrylates or methacrylates, ethylene-acrylic acid or methacrylic acid, and ethylene-arylic or metharylic acid ionomers. In rigid packaging applications, polystyrene is used, and in rigid articles such as beverage containers, polyethylene terephthalate (PET, is often used. See U.S. Pat. No. 5,021,515. Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the composition of the present invention. In some instances, the clarity, cleanliness, effectiveness as an oxygen scavenger, barrier properties, mechanical properties and/or texture of the article can be adversely affected by a blend containing a polymer which is incompatible with the composition of the present invention.

One particular advantage of the compositions of the present invention where ethylene-methyl acrylate copolymer is modified to form ethylene benzyl acrylate copolymer is the substantial similarity of the properties of the ethylene benzyl acrylate copolymer to the properties of ethylene-methyl acrylate copolymer and polyethylene. This permits the inclusion of compositions of the present invention in a wide range of applications where polyethylene and ethylene-methyl acrylate copolymer are used.

A blend of a composition of the present invention with a compatible polymer can be made by dry blending or by melt-blending the polymers together at a temperature in the approximate range of 50° C. to 250° C. Alternative methods of blending include the use of a solvent followed by evaporation. When making film layers or articles from oxygen-scavenging compositions, extrusion or coextrusion, solvent casting, injection molding, stretch blow molding, orientation, thermoforming, extrusion coating, coating and curing, lamination or combinations thereof would typically follow the blending.

The amounts of transition-metal salt, polymer comprising a polyethylenic backbone having pendant moieties comprising benzyl, allylic, and/or heteroatom-containing radicals, and optional polymeric diluents and additives vary depending on the article to be manufactured and its end use. These amounts also depend on the desired scavenging capacity, the desired scavenging rate, the induction period of the oxygen scavenger, and the particular materials selected.

The compositions of the present invention have various induction periods before the compositions become effective oxygen scavengers. For example, to scavenge oxygen using essentially an ethylene benzyl acrylate copolymer, the composition must either have its induction period reduced, such as by exposing it to ultraviolet light, or the induction period must lapse. However, a composition comprising an ethylene benzyl acrylate copolymer having one or more methoxy radicals substituted onto each phenyl radical will have a very short induction period without exposure to actinic radiation, so that the composition is effective to scavenge oxygen almost immediately. Thus, the particular composition chosen for a given use will depend in part on the length of time that the composition is to be stored prior to scavenging oxygen. See Example 29 and FIG. 1.

Layers comprising the composition of the present invention may be in several forms. They may be in the form of stock films, including "oriented" or "heat shrinkable" films, which may ultimately be processed as bags, etc., or in the form of stretch-wrap films. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

Many of the oxygen-scavenging compositions, such as ethylene benzyl acrylate copolymer, have sufficient tie-strength to be useful additionally as a tie-layer in a multi-layer structure. Thus, separate tie layers may not be necessary for binding the composition of the present invention into a multi-layer film. Also, the oxygen-scavenging composition can have sufficient hot-tack properties that a layer made from the composition of the present invention will function additionally as the heat-seal layer.

In multilayered articles, the scavenging layer comprising the composition of the present invention may be included with layers such as, but not necessarily limited to, "oxygen barriers", i.e., layers of material having an oxygen transmission rate equal to or less than 100 cubic centimeters-mil per square meter (cc-mil/m$^2$) per day per atmosphere pressure at room temperature, i.e., about 25° C. Typical oxygen barriers comprise poly(ethylene vinyl alcohol), polyacrylonitrile, polyvinyl chloride, poly(vinylidene dichloride), polyethylene terephthalate, silica, and polyamides. Metal foil layers can also be employed.

The additional layers may also include one or more layers which are permeable to oxygen. In one preferred embodiment, especially for flexible packaging for food, the layers include, in order starting from the outside of the package to the innermost layer of the package, (i) a structural layer to provide mechanical strength and to act as a moisture barrier (e.g. high-density polyethylene), (ii) an oxygen barrier layer, (iii) a layer comprising an oxygen-scavenging composition of the present invention, and optionally, (iv) a functional layer such as EVA. Control of the oxygen barrier property of (ii) allows a means to regulate the scavenging life of the package by limiting the rate of oxygen entry to the scavenging component (iii), and thus limiting the rate of consumption of scavenging capacity. The functional layer in a multi-layered composition is a layer which is added to perform functions which the adjacent layer cannot perform as well as the functional layer. The functional layer can provide a barrier to stop or slow migration of compounds contained within a composition of the present invention into the package interior. These migrating compounds include additives or by-products of oxygen scavenging. The functional layer may improve the heat-sealability, clarity and/or resistance to blocking of the multi-layer film. Control of the oxygen permeability of the functional layer also allows a means to set an upper limit on the rate of oxygen scavenging for the overall structure independently of the composition of the scavenging component (iii). This can serve the purpose of extending the handling lifetime of films in the presence of air prior to sealing the package.

The multilayered articles can be prepared using coextrusion, coating and/or lamination. In addition to oxygen barrier and oxygen permeable layers, further layers such as tie-layers which function to bind the other layers into one film and adhesive layers which make the overall film adhesive to other surfaces may be adjacent to any of the layers listed above. Compositions suitable for tie-layers or adhesive layers include those well known in the art, such as maleic anhydride functionalized polyolefins.

To determine the oxygen scavenging capabilities of a composition, the rate of oxygen scavenging can be calculated by measuring the time elapsed before the article depletes a certain amount of oxygen from a sealed container. For instance, a film comprising the scavenging component can be placed in an air-tight, sealed container of a certain oxygen containing atmosphere, e.g., air which typically contains 20.9% oxygen by volume. Then, over a period of time, samples of the atmosphere inside the container are removed to determine the percentage of oxygen remaining.

The scavenging rates of the composition and layers of the present invention will change with changing temperature and atmospheric conditions.

When an active oxygen barrier is prepared, the scavenging rate can be as low as 0.1 cc oxygen per gram of composition of the present invention per day in air at 25° C. and at 1 atmosphere pressure. However, preferable compositions of this invention have rates equal to or greater than 1 cc oxygen per gram per day, thus making them suitable for scavenging oxygen from within a package, as well as suitable for active oxygen barrier applications. Many compositions are even capable of more preferable rates equal to or greater than 5.0 cc $O_2$ per gram per day.

Generally, film layers suitable for use as an active oxygen barrier can have an oxygen transmission rate as high as 10 cc oxygen per square meter per mil per day when measured in air at 25° C. and 1 atmosphere pressure. Preferably, a layer of this invention has an oxygen transmission rate less than about 1 cc oxygen per square meter per mil per day, and more preferably has an oxygen transmission rate less than about 0.2 cc oxygen per square meter per mil per day under the same conditions, thus making it suitable for active oxygen barrier applications as well as for scavenging oxygen from within a package.

In an active oxygen barrier application, it is preferable that the combination of oxygen barriers and any oxygen scavenging activity create an overall oxygen transmission rate of less than about 1.0 cubic centimeter-mil per square meter per day per atmosphere pressure at 25° C. Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to establish an internal oxygen level of less than 0.1% in less than about four weeks.

In a packaging article made according to this invention, the scavenging rate will depend primarily on the amount and nature of the composition of the present invention in the article, and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of the scavenging moieties present in the article, as discussed above.

In actual use, the oxygen scavenging capacity requirement of the article will largely depend on three parameters of each application:

1. the quantity of oxygen initially present in the package,
2. the rate of oxygen entry into the package in the absence of the scavenging property, and
3. the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 500 cc oxygen per square meter per mil thickness.

Other factors may also affect oxygen scavenging and should be considered when selecting compositions. These factors include but are not limited to temperature, relative humidity, and the atmospheric environment in the package.

As illustrated in the Examples, some embodiments of the invention go through an "induction period" before they exhibit oxygen scavenging. It has been found that this induction period can be shortened substantially by exposing the composition to radiation. To initiate oxygen scavenging in an oxygen scavenger is defined herein as facilitating scavenging such that the induction period of oxygen scavenging is significantly reduced or eliminated. The induction period is the period of time before the scavenging composition exhibits useful scavenging properties. Further, initiation of oxygen scavenging may also apply to compositions which have an indeterminate induction period in the absence of radiation.

While the exact manner in which oxygen scavenging is initiated is not known, it is postulated, without limiting the invention to any specific theory, that one or more of the following occurs when the oxygen scavenger is exposed to radiation:

a. substantial depletion of any antioxidant(s), if present, thus allowing oxidation to proceed;

b. activation of the transition metal catalyst through a change in the metal's oxidation state and/or its configuration of ligands, thus increasing its effect on scavenging; or c. a substantial increase in free radical and/or peroxide species present in the system, despite the inhibiting effect of any antioxidant(s) if present or remaining.

When using oxygen scavenging layers or articles, exposure to radiation can be during or after the layer or article is prepared. If the resulting layer or article is to be used to package an oxygen sensitive product, exposure can be prior to, during, or after packaging. For best uniformity of radiation, exposure should occur when the layer or article is a flat sheet.

A composition of the present invention comprising a transition-metal salt and an ethylene benzyl acrylate provides substantial advantages in packaging food products. An article or wrap for containing food can be made from the composition, and oxygen scavenging capabilities of the composition can be initiated by exposing the article or film to actinic radiation to reduce the induction period prior to or even after food is enclosed within the composition of the present invention. This provides the ability to supply food having the freshest flavor. Also, initiation of the oxygen scavenging properties at the time of packaging food permits the greatest shelf-life, since the full oxygen scavenging capacity of the article or film is utilized in keeping oxygen out of the food.

The compositions and methods are illustrated by the following examples, which are not intended to limit the invention in any way.

EXAMPLE 1

Autoclave Synthesis of Ethylene-Benzyl Acrylamide Copolymer A

One hundred (100) parts by weight of an ethylene-methyl acrylate copolymer, which contained 40 wt. % methyl acrylate (MA) and 60 wt. % ethylene, and had a melt-index (MI) of 8 g/10 min., was charged to a 300 cc autoclave with 100 parts of benzyl amine. The mixture was heated to 240° C. under nitrogen for 5 hours with continued stirring. The resulting polymer was pulverized under liquid nitrogen and washed with hexane, then methanol. After drying under vacuum, 107 parts of polymer A was obtained. Infra-red spectroscopy and nitrogen analysis indicated quantitative conversion of the methyl ester to the benzyl-amide. 95 parts of nylon-6 from Custom Resin, Inc. were blended with 5 parts of Polymer A and cobalt neodecanoate in the ratio provided in Example 12 in a Haake System 90 Rheomix TW-100 conical twin-screw extruder (hereafter "Haake-90") at 210° C. Films were prepared by the method of Example 27.

EXAMPLE 2

Solution Synthesis of Ethylene-3-Methoxybenzyl-acrylamide Copolymer B

One hundred (100) parts by weight of an ethylene-methyl acrylate copolymer (40 wt. % MA) was dissolved in 150 parts of decalin at 180° C. 54 parts of 3-methoxybenzyl amine was added along with 24 parts of 2-pyridone, and the solution was refluxed at 184° C. for 12 hours. After cooling, the polymer solution was precipitated in methanol and dried in a vacuum oven to give polymer B. Infra-red analysis indicated a quantitative conversion of ester to amide. Blends with nylon-6 from Custom Resin, Inc. were prepared by feeding 5 parts of Copolymer B and 95 parts of nylon-6 to a Haake-90 twin-screw extruder at 210° C. Films were prepared by the method of Example 27.

EXAMPLE 3

Solution Synthesis of Ethylene-Methyl Acrylate-Benzyl Acrylate Terpolymer C

One hundred (100) parts by weight of an ethylene-methyl acrylate copolymer (20 wt. % MA) was dissolved in 150 parts of decalin, along with 50 parts of benzyl alcohol and 0.5 part of tetraethyl titanate, a transesterification catalyst. The mixture was refluxed at 184° C. for 3 hours and worked up as described in Example 2. NMR analysis indicated 88% conversion of methyl ester to benzyl ester.

EXAMPLE 4

Solution Synthesis of Ethylene-Methyl Acrylate-Benzyl Acrylate Terpolymer D

The procedure of Example 3 was followed except that 0.5 part of di-butyl tin dilaurate was used instead of tetraethyl titanate. Polymer D was isolated with a 72% conversion of methyl ester to benzyl ester after 7 hours of reaction.

EXAMPLE 5

Solution Synthesis of Ethylene-Methyl Acrylate-Benzyl Acrylate Terpolymer E

The procedure of Example 3 was followed except that 0.5 part of sodium methoxide was used instead of the tetraethyl titanate. Polymer E was isolated with a 64% conversion of methyl ester to benzyl ester after 10 hours of reaction.

EXAMPLE 6

Solution Synthesis of Ethylene-Methyl Acrylate-Benzyl Acrylate Terpolymer F

The procedure of Example 3 was followed except that 0.5 part of toluene sulfonic acid was used instead of the tetra-ethyl titanate. Polymer F was isolated with a 43% conversion of methyl ester to benzyl ester after 15 hours of reaction.

Reactive Extrusion

Examples 7–11 were produced via reactive extrusion. In these examples, a Werner Pfleiderer ZSK-30 twin-screw extruder was used. Ethylene-methyl acrylate copolymer was fed into the extruder and melted, and the reactant(s) (such as benzyl alcohol) and catalyst(s) were added to the extruder in a subsequent reaction zone. Although the following examples utilized ethylene-methyl acrylate copolymer, the method described herein is not limited to use of only ethylene-methyl acrylate copolymer.

Two vent ports on the extruder produced a higher conversion of methyl ester to benzyl or benzylic ester, and they reduced the flooding which often occurred in a screw with only one vent port. The first vent port downstream of the point where reactant(s) and catalyst(s) are added was open to the atmosphere to allow reaction by-products (in the examples, methanol) to escape. The by-products may also be removed under slight vacuum. The second vent port, downstream of the first, was under vacuum to remove any residual reactants (such as benzyl alcohol), which normally have higher boiling points than the by-products. Additional downstream vent ports can be used, if desired.

The temperature in the extruder was selected primarily to provide a uniform mixture of melted polymer, reactant(s) and catalyst(s) without degrading the polymer. However, the temperature was also selected to produce the greatest difference in vapor pressure between the by-products and the reactants (where the by-products have a lower boiling-point than the reactants). Normally, the temperature will be at or slightly below the boiling point of the reactants.

In some of the following examples, ethylene-methyl acrylate copolymer and benzyl alcohol were reacted at about 205° C., which is the boiling point of benzyl alcohol. The first vent port pressure was about 760 mm Hg, and the second vent port pressure was about 25 mm Hg. This method provided a uniform mixture of copolymer, reactants, and catalyst, and also gave the greatest difference in vapor pressure between benzyl alcohol and methanol. This procedure provides improved conversions of methyl ester to benzyl ester over the method where one vent port is used to remove both the byproduct, methanol, and excess reactant, benzyl alcohol.

EXAMPLE 7

Preparation of Ethylene-Methyl Acrylate-Benzyl Acrylate Terpolymer G by Reactive Extrusion Ethylene-methyl acrylate copolymer (40 wt. % MA, 8 g/10 min. MI) copolymer was fed into a Werner Pfleiderer ZSK-30 twin screw extruder at a feed rate of 3 kg/hr with a barrel temperature of about 205°–210° C. Benzyl alcohol and tetraethyl titanate were fed into the first mixing zone at rates of 1.5 kg/hr and 15 g/hr, respectively. The resulting polymer was pelletized, and NMR analysis indicated a 29% conversion of methyl ester to benzyl ester with no detectable amount of free benzyl alcohol. The melt index of the resulting Terpolymer G was 7.75 g/10 min at 190° C., and its composition was 54 wt. % ethylene, 26 wt. % methyl acrylate, and 20 wt. % benzyl acrylate. The polymer composition was calculated based on NMR analysis.

EXAMPLE 8

Preparation of Ethylene-Methyl Acrylate-Benzyl Acrylate Terpolymer H by Reactive Extrusion The procedure of Example 7 was followed, except ethylene-methyl acrylate copolymer having 24 wt. % MA and 2 g/10 min. MI was used, while the benzyl alcohol and titanium catalyst feed rates were 1.8 kg/hr and 18 g/hr, respectively. The product, polymer H, had a MI of 2.19, with a 51% conversion of methyl ester to benzyl ester based on NMR analysis. The weight ratio of ethylene/methyl acrylate/ benzyl acrylate of Polymer H was 69/10/21.

EXAMPLE 9

Preparation of Ethylene-Methyl Acrylate-Benzyl Acrylate Terpolymer H-Me, Having a Partial 3-methyl Substitution on the Phenyl Ring The procedure of Example 8 was followed to make Polymer H-Me, except that a solution of 99 wt. % benzyl alcohol and 1 wt. % of 3-methylbenzyl alcohol was used in place of the benzyl alcohol of Example 8. 48% of the methyl ester radicals were converted to benzyl ester radicals or 3-methylbenzyl ester radicals, based on NMR analysis. The weight ratios of ethylene/methyl acrylate/benzyl acrylate were 69/11/20.

EXAMPLE 10

Preparation of Ethylene-Methyl Acrylate-Benzyl Acrylate Terpolymer H-OMe, Having a Partial 3-methoxy Substitution on the Phenyl Ring The procedure of Example 9 was followed to make Polymer H-OMe, except 3-methoxybenzyl alcohol was substituted in place of the 3-methylbenzyl alcohol of Example 9. 45% of the methyl ester radicals were converted to benzyl ester radicals or 3-methoxybenzyl ester radicals. The weight ratios of ethylene/methyl acrylate/benzyl acrylate were 69/12/19 for Polymer H-OMe.

EXAMPLE 11

Preparation of Ethylene-Methyl Acrylate-Benzyl Acrylate Terpolymer I by Reactive Extrusion The procedure of Example 7 was followed except that a 20% MA ethylene-methyl acrylate copolymer and a MI of 6 g/10 min. was used as the feed polymer. The product, polymer I, had a melt index of 6.25 g/10 min, with a 39% conversion of methyl ester radicals to benzyl ester radicals, based on NMR analysis. The weight ratio of ethylene/methyl acrylate/benzyl acrylate was 75/11/14.

EXAMPLE 12

Blending of Cobalt Salt with Polymer A 1000 parts of polymer A pellets were tumble mixed with 8.3 parts of cobalt neodecanoate (which contains 1 part cobalt) in 20 parts of hexane. The hexane was removed by vacuum, and the cobalt-coated resins were extruded into pellet form, then into films by the method of Example 27.

EXAMPLE 13

Blending of Cobalt Salt with Polymer B

The method of Example 12 was repeated, substituting Polymer B for Polymer A.

EXAMPLE 14

Blending of Cobalt Salt with Polymer C

The method of Example 12 was repeated, substituting Polymer C for Polymer A. The film made from this polymer had the following properties: tensile strength 1243 psi; elongation 726%; and melting point 86° C.

Analyses for tensile strength, elongation, Young's modulus, and 1% secant were performed by ASTM method no. D-882.

EXAMPLE 15

Blending of Cobalt Salt with Polymer D

The method of Example 12 was repeated, substituting Polymer D for Polymer A.

EXAMPLE 16

Blending of Cobalt Salt with Polymer E

The method of Example 12 was repeated, substituting Polymer E for Polymer A.

EXAMPLE 17

Blending of Cobalt Salt with Polymer F

The method of Example 12 was repeated, substituting Polymer F for Polymer A.

EXAMPLE 18

Blending of Cobalt Salt with Polymer G

The method of Example 12 was repeated, substituting Polymer G for Polymer A.

EXAMPLE 19

Blending of Cobalt Salt with Polymer H to Form Polymer H-1000

The method of Example 12 was repeated, substituting Polymer H for Polymer A.

EXAMPLE 20

Blending of Cobalt Salt with Polymer H to Form Polymer H-250

The method of Example 19 was repeated, using 2.1 parts of cobalt neodecanoate (which contains 0.25 part cobalt) in 5 parts of hexane in place of the 8.3 parts of cobalt neodecanoate in 20 parts of hexane.

EXAMPLE 21

Blending of Cobalt Salt with Polymer H to Form Polymer H-500

The method of Example 19 was repeated, using 4.2 parts of cobalt neodecanoate (which contains 0.50 part cobalt) in 10 parts of hexane in place of the 8.3 parts of cobalt neodecanoate in 20 parts of hexane.

EXAMPLE 22

Blending of Cobalt Salt with Polymer H to Form Polymer H-2000

The method of Example 19 was repeated, using 16.6 parts of cobalt neodecanoate (which contains 2.0 parts cobalt) in 40 parts of hexane in place of the 8.3 parts of cobalt neodecanoate in 20 parts of hexane.

EXAMPLE 23

Blending of Cobalt Salt with Polymer H-Me

The method of Example 12 was repeated, substituting Polymer H-Me for Polymer A.

EXAMPLE 24

Blending of Cobalt Salt with Polymer H-OMe

The method of Example 12 was repeated, substituting Polymer H-OMe for Polymer A.

EXAMPLE 25

Blending of Cobalt Salt with Polymer I

The method of Example 12 was repeated, substituting Polymer I for Polymer A.

EXAMPLE 26

Melt Blending of Cobalt Salt to Copolymers

Polymers A to I are individually melt processed at about 180° C. in a ZSK-30 twin screw extruder. The polymer feed rate is maintained at 10 kg/hr while cobalt neodecanoate is metered into the first mixing zone at a rate of 83 g/hr. The products which contain about 1000 ppm Co are pelletized and are stored for later film processing.

EXAMPLE 27

Polymer Film Preparation with Randcastle Extruder

A Randcastle Microtruder was used to extrude monolayer films of about 5 mil thickness of polymers with cobalt. The die temperature, feed block, and adapter were set at 420° F., and the feeder RPM was set at 143. All films were soft and flexible and were observed to have good clarity.

EXAMPLE 28

UV Initiation of Oxygen Scavenging

Some films were irradiated prior to performing oxygen scavenging studies. These films were exposed to UV radiation under a 15 watt UV lamp (a Blak-Ray lamp, model XX-15S, made by UVP Inc.) for 5 minutes at a distance of 5 inches.

The effect of UV irradiation is clearly seen for Polymer H-1000 of Example 19, for example. The irradiated film scavenged oxygen much more rapidly.

EXAMPLE 29

Oxygen Scavenging without UV Irradiation 2 grams of film of each polymer from Examples 19, 23, and 24 were sealed in separate 1-liter capacity bottles, and oxygen depletion was monitored using a Mocon 710 oxygen analyzer.

The results shown in FIG. 1 show that these samples scavenge oxygen without UV irradiation at different rates, depending on the group substituted onto the phenyl ring.

EXAMPLE 30

Oxygen Scavenging Rate and Capacity Studies

Rate and capacity of oxygen removal at 25° C. and at 55° C. were measured by placing polymer film samples in sealed bottles which had 20.9% or 2% oxygen, as specified, and monitoring the oxygen depletion by gas chromatography and/or by Mocon 710 oxygen analyzer.

About 5 grams of polymer film were used for 22 cc and 250 cc capacity bottles. About 2 grams of polymer film were used for 1 liter capacity bottles. Oxygen depletion was monitored by gas chromatography (GC) or with a Mocon 710 oxygen analyzer. The following Table 1 exemplifies the oxygen scavenging activities recorded for 22 cc, 250 cc and 1 liter bottles.

TABLE 1

| COMPOSITION OF EXAMPLE #[1] | BOTTLE SIZE (cc)[2] | UV IRRAD-IATED | 4 hr.[4] | 1 day[4] | 2 days[4] | 4 days[4] | 7 days[4] | 14 days[4] | 21 days[4] |
|---|---|---|---|---|---|---|---|---|---|
| 12 | 22 | no | | | | | 20.9 | 20.9 | |
| 12[3] | 22 | no | | | 17.7 | | 6.4 | | |
| 13 | 22 | no | | | 14.8 | | 14.3 | | |
| 14 | 22 | no | 20.8 | 20.7 | | | 20.6 | 15.0 | 1.68 |
| 18 | 22 | yes | 20.8 | 20.2 | 13.1 | | 4.0 | | |
| 19 | 1000 | no | | 20.4 | 20.3 | 19.8 | 19.6 | | |
| 19 | 1000 | yes | 20.6 | 19.5 | 15.1 | 8.9 | 6.1 | | |
| 20 | 1000 | no | | 20.3 | 20.2 | 19.9 | 19.8 | | |
| 20 | 1000 | yes | 20.4 | 20.0 | 19.9 | 19.5 | 18.5 | | |
| 21 | 1000 | no | | 20.4 | 20.0 | 18.5 | 11.3 | | |
| 21 | 1000 | yes | 20.5 | 20.0 | 19.5 | 16.1 | 9.6 | | |
| 22 | 1000 | no | | 20.3 | 20.2 | 19.7 | 19.3 | | |
| 22 | 1000 | yes | 20.5 | 19.7 | 14.9 | 7.8 | 4.4 | | |
| 23 | 250 | no | 20.7 | 20.7 | 20.4 | | 17.6 | 10.3 | 4.0 |
| 23 | 250 | yes | 20.2 | 12.0 | 0.2 | | | | |
| 24 | 250 | no | 20.2 | 20.7 | 20.5 | | 0.3 | | |
| 24 | 250 | yes | 20.2 | 7.7 | 0.0 | | | | |
| 25 | 250 | no | | 18.6 | 0.5 | | | | |
| 34 | 1000 | no | 20.7 | 20.4 | 20.4 | 20.1 | 20.0 | 19.6 | |

TABLE 1-continued

| COMPOSITION OF EXAMPLE #[1] | BOTTLE SIZE (cc)[2] | UV IRRAD- IATED | 4 hr.[4] | 1 day[4] | 2 days[4] | 4 days[4] | 7 days[4] | 14 days[4] | 21 days[4] |
|---|---|---|---|---|---|---|---|---|---|
| 34 | 1000 | yes | 20.7 | 20.4 | 20.2 | 20.0 | 20.0 | 19.7 | |
| 38 | 1000 | yes | 20.9 | 20.8 | 20.1 | 20.7 | 20.7 | | |

NOTES:
[1]Oxygen-scavenging temperature was 25° C., except where noted otherwise.
[2]All bottles in these experiments had 20.9% oxygen when the samples were placed in the bottles.
[3]Oxygen-scavenging temperature for this experiment was 55° C.
[4]Times listed are lengths of time after the samples were placed in bottles to scavenge oxygen. Numbers in these columns are percent oxygen remaining in the bottles.

EXAMPLE 31

Oxygen Scavenging Capacity Studies

Figure 2:
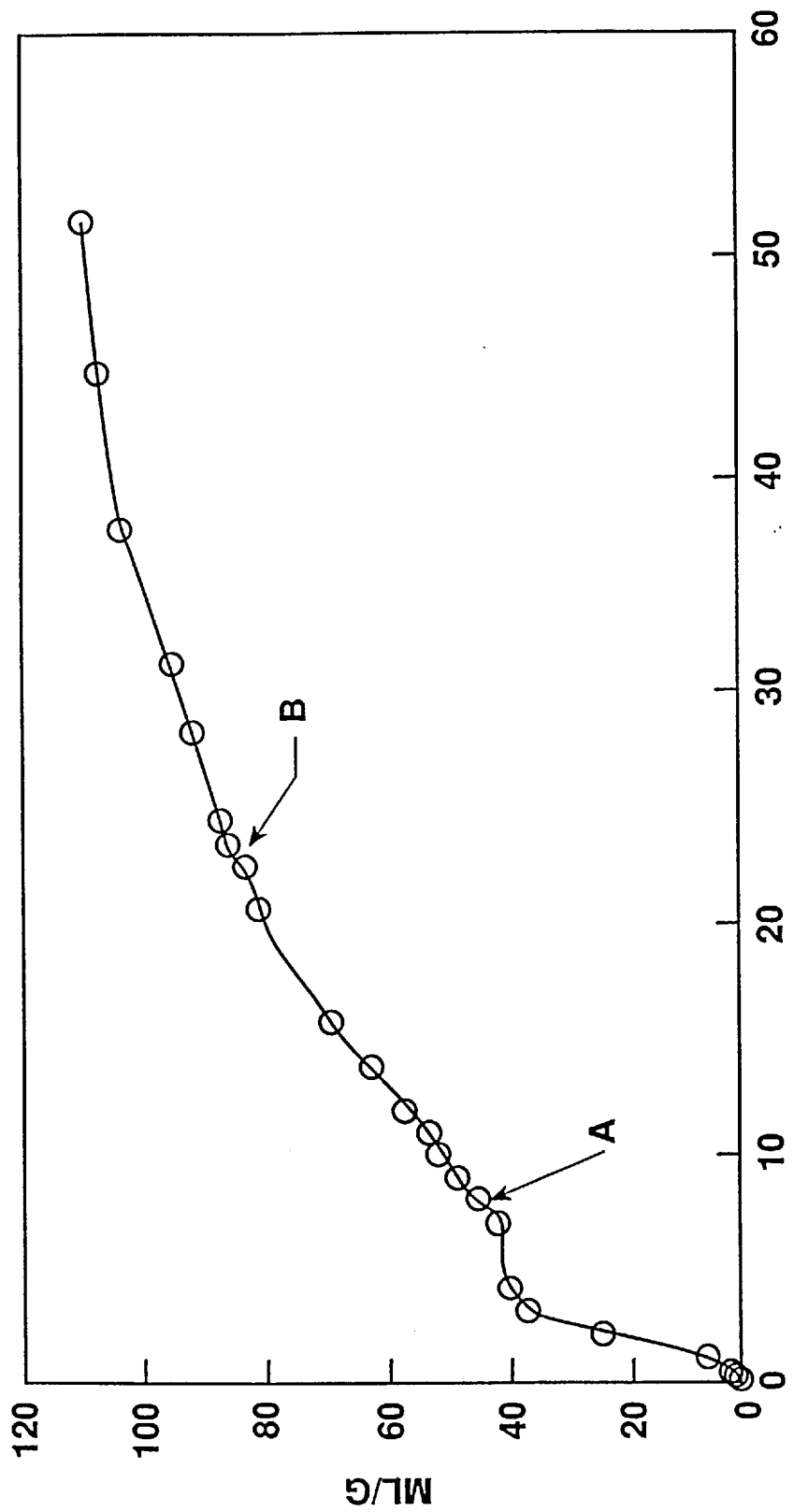
FIG. 2 illustrates the oxygen scavenging capacity for a 5 gram sample of polymer of Example 19 at room temperature. The ordinate is time in days, and the abscissa is oxygen uptake, measured in ml/g. At points A and B, the 1000 ml headspace was refilled with air.
Figure 3:
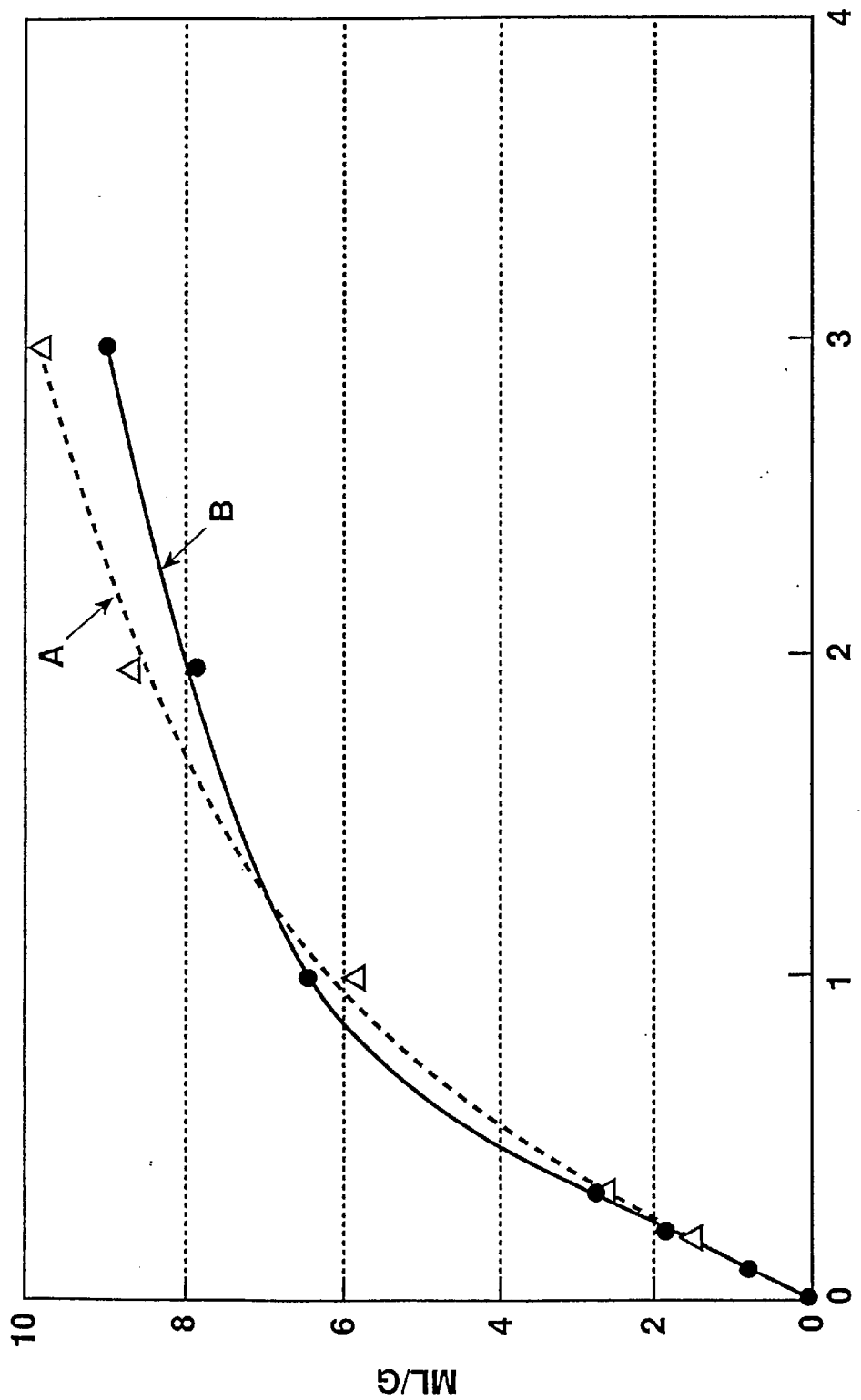
FIG. 3 compares the scavenging rate and capacity of 2 grams of polymer of Example 19, line A, with 2 grams of Ageless, line B, a product available from Mitsubishi Gas Chemical Co. The ordinate is time in days, and the abscissa is oxygen uptake, measured in ml/g. The analysis bottle had 1000 ml headspace and 2% oxygen in the headspace.

The total oxygen absorption capacity per gram of film of the polymer of Example 19 (Polymer H-1000) was measured and is shown in FIG. 2. Also, the capacity of polymer H-1000 to scavenge oxygen within the first few days at reduced oxygen concentration (i.e. starting at 2% $O_2$) was measured and compared with a commercial oxygen scavenger, Ageless, available from Mitsubishi Gas Chemical Co. (see FIG. 3). These conditions simulate a method of purging oxygen with nitrogen gas during packaging of food. FIG. 3 shows that polymer H-1000 was superior to Ageless in scavenging oxygen at low concentrations, since polymer H-1000 scavenged all but 0.02% of the oxygen from the container head-space while Ageless left 0.12% of the oxygen.

EXAMPLE 32

Effect of Cobalt Level on Oxygen Scavenging Rates and Capacities

Figure 4:
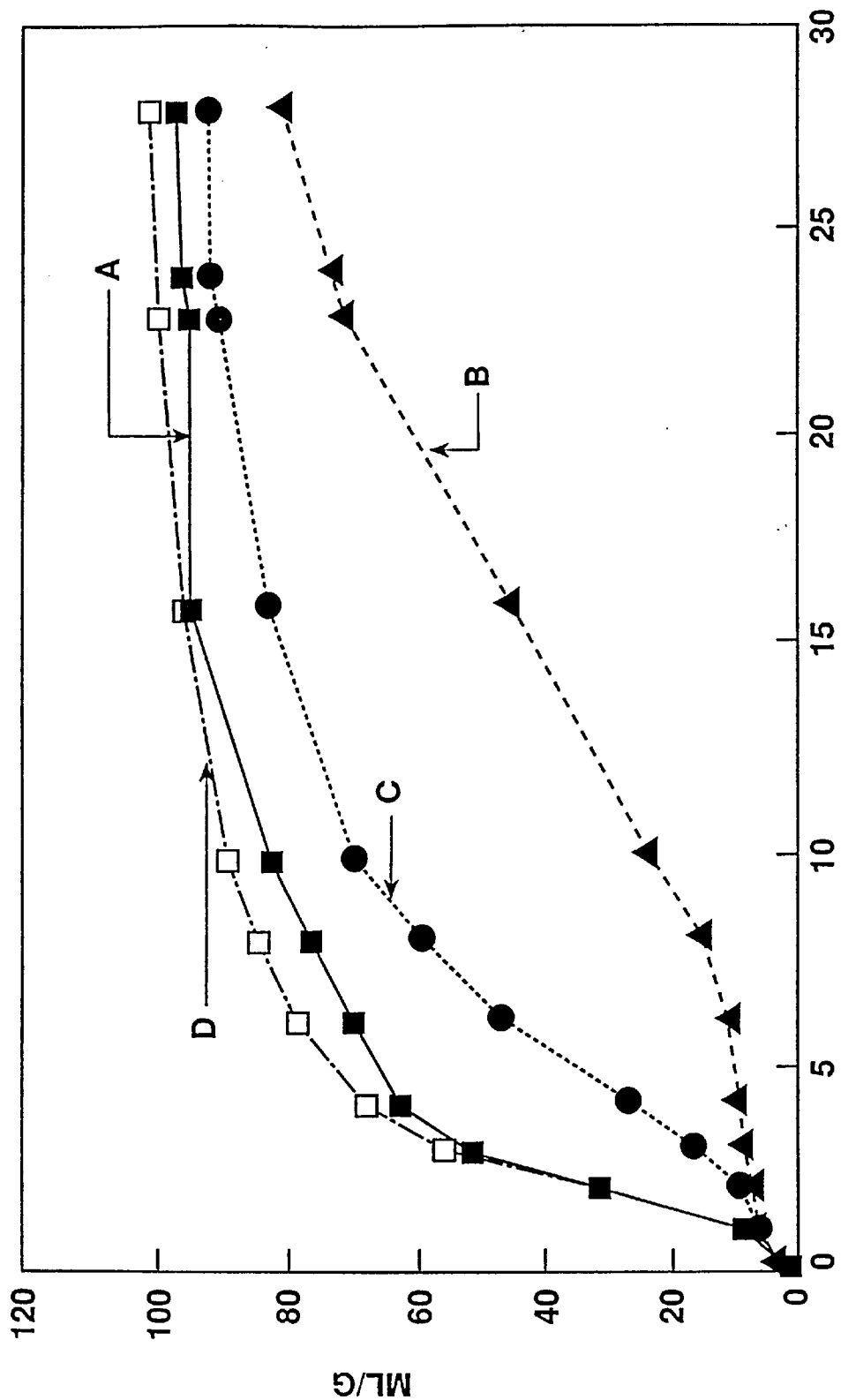
FIG. 4 illustrates the effect of various cobalt levels on the oxygen scavenging rate for 2 gram samples in 1000 cc of headspace. The ordinate is time in days, and the abscissa is oxygen uptake, measured in ml/g. Lines A, B, C and D show the oxygen scavenging rate for polymer of Examples 19, 20, 21 and 22, respectively.

The cobalt content of compositions using Polymer H was varied to determine its effect on the oxygen scavenging rate. Oxygen scavenging rates and capacities were measured for UV-irradiated films of polymers from Examples 19 through 22, and the results are shown in FIG. 4.

EXAMPLE 33

Improved Barrier Properties

Figure 5:
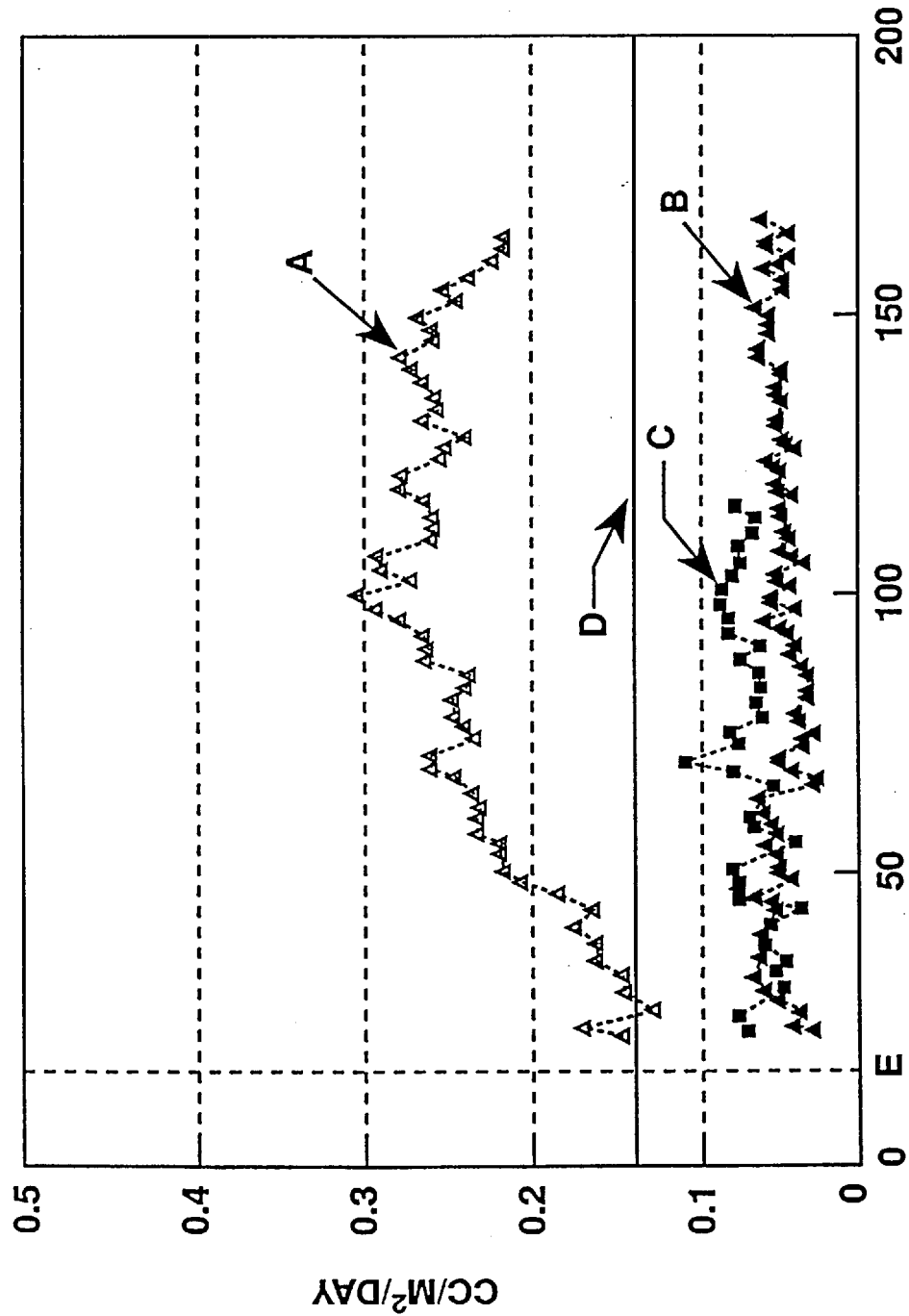
FIG. 5 compares the oxygen transmission rate (OTR) for two 3-layer films, one utilizing polymer from Example 25 (Line A, without UV treatment, having an average OTR of about 0.24 $cc/m^2/day$, and Line B, with a 10 min. exposure to a 5.2 $mw/cm^2$ UV source at a distance of 5 in. and having an average OTR of about 0.06 $cc/m^2/day$) and one using polymer from Example 19 (Line C, with the same UV dose given to polymer of Ex. 25). Line D is the theoretical OTR of a mono-layer of ethylene-vinyl alcohol copolymer (0.13 $cc/m^2/day$). The ordinate is time in hours, and the abscissa is oxygen transmission rate, measured in $cc/m^2/day$. These rates are compared to the theoretical oxygen transmission rate of a 2-mil thick film of ethylene-vinyl alcohol copolymer resin. Point E is the time at which oxygen was started. For the purposes of this invention, 1 cc is considered to be equivalent to 1 ml.

Polymer of Example 25 was co-extruded with a commercial oxygen barrier ethylene vinyl alcohol (EVOH) (available from Eval Co. of America, grade Eval F-104) and a Bynel 388 tie layer (available from DuPont), using a Randcastle Minitruder. The resulting 3-layer structures showed a four-fold reduction in oxygen transmission rate over EVOH alone. Similar results were observed for 3-layer structures made with polymer H-1000 of Example 19. See FIG. 5.

COMPARATIVE EXAMPLE 34

Oxygen Scavenging Performance of Ethylene-Methyl Acrylate Copolymer with Cobalt Ethylene-methyl acrylate copolymer (EMAC® copolymer grade SP-2260, made by Chevron) having 24 wt. % MA and a MI of 2 g/10 min. was blended with 1000 ppm cobalt as described in Example 12. The resin containing cobalt salt was extruded into a film as described in Example 27. The films were tested with and without the UV radiation as described in Example 28. Little oxygen scavenging was found in either case.

EXAMPLE 35

Analysis of Products of Oxidation

After Polymer H-1000 was oxidized for six days using a 5 g. sample in a bottle having a capacity of 1000 cc, it was extracted with methanol, concentrated, and analyzed by gas chromatography and gas chromatography coupled with mass spectroscopy. Over 95% of the oxidation product was benzoic acid.

Physical properties of Polymer H-1000 were analyzed before and after scavenging 40.6 cc of oxygen per gram of Polymer H-1000 over a 6-day period. These results are summarized in Table 2.

TABLE 2

| | BEFORE OXIDATION | AFTER OXIDATION |
|---|---|---|
| Tensile strength (psi) | 1769 | 712 |
| % elongation | 707 | 493 |
| Young's modulus (psi) | 2768 | 2947 |
| 1% secant (psi) | 2320 | 2463 |

EXAMPLE 36

Synthesis of Benzylimide-containing Terpolymer from Ethylene-Butylacrylate-Maleic Anhydride Terpolymer 100 parts of Lotador 4700, available from Elf Atochem, containing 3% maleic anhydride, and 10 parts of 3-methoxy benzylamine are kneaded at 150° C. in 50 parts of decalin for 3 hours, followed by 2 hours at 185° C. under vacuum to dehydrate the acid-amide. Product formation can be monitored by the conversion of the anhydride band to the imide band with infrared spectrometry. Precipitation of the polymer solution in methanol is followed by filtration and vacuum drying overnight to produce a polymer product in which there is partial conversion of the anhydride to imide. 1000 ppm cobalt is incorporated in this polymer, as discussed above. A thin film of this polymer is extruded with the Randcastle Microtruder.

EXAMPLE 37

Synthesis of Ethylene-3-methylphenyl acrylate 100 parts of EMAC® copolymer SP-2260 (available from Chevron Chemical Co.), 16 parts of meta-methylphenol, and 0.5 part of tetraethyl titanate were refluxed in decalin at 180°

C. for 6 hours. The polymer product was precipitated in methanol to give polymer with 36% of the methyl ester radicals converted to 3-methylphenyl ester radicals. Cobalt neodecanoate was added by the method of Example 12, where the ethylene-3-methylphenyl acrylate replaced polymer A, and a film was made by the method of Example 27. This composition scavenged oxygen slowly.

COMPARATIVE EXAMPLE 38

Polystyrene as an Oxygen Scavenger

A solution of approximately 20 wt. % cobalt neodecanoate in hexane was dispersed at room temperature over pellets of Chevron Grade EA3000 polystyrene (not rubber modified) in a quantity sufficient to provide about 1000 ppm by weight of cobalt in the final composition. The solvent was stripped off by use of a rotary vacuum evaporator. A film was made by the method of Example 27. The oxygen scavenging performance was determined by the method of Example 30 and is summarized in Table 1. This example shows that a benzyl radical pendant to the polyethylenic backbone is much more effective in scavenging oxygen than an aryl radical such as phenyl, despite both compositions having tertiary hydrogen atoms present in the polymer backbone.

EXAMPLE 39

Poly(ethyl Methacrylate-Benzyl Methacrylate)

350 grams (3.5 mole) of polymethylmethacrylate (Plexiglass VO 44 from Rohm & Haas), 378 grams of benzyl alcohol (3.5 mole) and 0.54 gram (0.1 mole %) of an antioxidant Irganox 1076 were heated to 180° C. to dissolve them in 550 cc of decalin. 13.86 grams of tetraisopropyl titanate was added and the temperature was maintained at 180°–190° C. for 14 hours, and during this time 23 ml of distillate containing methanol was collected and the reaction was stopped. The polymer was precipitated in methanol then washed with hexane. After drying at 55° C. overnight in an vacuum oven, 404 gram of polymer were recovered with a DSC melting point of 93°–94° C. NMR analysis showed a 22.6% conversion of methyl ester to benzyl ester.

This polymer was blended with cobalt neodecanoate by the method of example 12, and film was prepared as in example 27. The film was UV-irradiated as discussed above. This film scavenged about 10 cc of oxygen/gram of polymer after about 25 days at 25° C.

EXAMPLE 40

Synthesis of poly(ethylene-vinyl acetate-phenyl Acetate)

3 kg/hr. of ethylene-vinyl acetate copolymer (33% vinyl acetate) and 0.5 wt. % Irganox 1076 are fed to the extruder, which has a barrel temperature of 225° C. 0.5 kg/hr. of a solution containing 80% phenyl acetic acid and 0.2 wt. % toluene sulfonic acid in xylene is fed to the first mixing zone. The resulting polymer is pelletized, dissolved, precipitated in methanol, and dried under vacuum. This polymer is compounded with transition metal salt as described in Example 12.

EXAMPLE 41

Synthesis of dibenzyl 1,10-decanecarboxylate 230 grams of 1,10-decanedicarboxylic acid, 238 grams of benzyl alcohol and 0.5 gram of toluene sulfonic acid were dissolved in 200 ml of toluene and brought to 105° C. with stirring. The mixture was kept at this temperature for 10 hours, and 2 moles of water were slowly distilled off. Extra benzyl alcohol and toluene were removed by vacuum. Yield was 454 grams. The structure was confirmed by NMR.

EXAMPLE 42

Reactive Extrusion Synthesis of Assorted Specialty Polymers

Ethylene-methyl acrylate copolymer having 24 wt. % MA and MI of 2 g/10 min. is transesterified individually with the compounds indicated in Table 3 and in the presence of tetraethyl titanate catalyst in an extruder by the method of Example 7. The resulting polymers contain ester groups wherein the percentage of methyl moieties of the methyl acrylate indicated as converted in Table 3 are replaced with the hydrocarbyl group of the alcohol.

TABLE 3

| Polymer # | Transesterifying compound |
|---|---|
| J | 3-methyl-3-butenyl alcohol |
| K | trimethylpropane diallyl ether alcohol |
| L | farnesol |
| M | tetrahydropyran-2-methyl alcohol |
| N | 1,4-dioxane-2-methyl alcohol |

EXAMPLE 43

Oxygen Scavengers From Selected Specialty Polymers 1000 ppm cobalt as cobalt neodecanoate is combined individually with pellets of polymers J–N and uniformly mixed into pellets of the polymers. A film is made of each of the polymers.

EXAMPLE 44

Reactive Extrusion Synthesis of Assorted Specialty Polymers

Ethylene-methyl acrylate copolymer having 24 wt. % MA and MI of 2 g/10 min. was transesterified individually with the compounds listed in Table 4 and in the presence of tetraisopropyl titanate catalyst in an extruder substantially by the method of Example 7. The resulting polymers contained ester groups wherein the percentage of methyl moieties of the methyl acrylate indicated as converted in Table 4 were replaced with the hydrocarbyl group of the alcohol. All of the alcohols listed were obtained from Aldrich, with the exception that hydroxypolybutadiene was obtained from Nisso.

TABLE 4

| Polymer # | Transesterifying compound | % conversion of methyl acrylate groups |
|---|---|---|
| O | Nopol | >73% (1 mole Nopol used per 1 mole EMA copolymer) |
| P | Nopol | 14% |
| Q | Nopol | 48% |
| R | Ocenol 110/130 | 10% |
| S | Tetrahydrofurfuryl alcohol | — |

TABLE 4-continued

| Polymer # | Transesterifying compound | % conversion of methyl acrylate groups |
|---|---|---|
| T | Tetrahydrofurfuryl alcohol | 24% |
| U | Tetrahydrofurfuryl alcohol | 43% |

EMA = ethylene methyl acrylate copolymer
THF = tetrahydrofuran

EXAMPLE 45

Solution Synthesis of Assorted Specialty Polymers

Ethylene-methyl acrylate copolymer having 24 wt. % MA and MI of 2 g/IO min. was transesterified individually with the compounds listed in Table 5 and in the presence of tetraisopropyl titanate catalyst in solution substantially by the method of Example 3. The resulting polymers contained ester groups wherein the percentage of methyl moieties of the methyl acrylate indicated as converted in Table 4 were replaced with the hydrocarbyl group of the alcohol. All of the alcohols listed were obtained from Aldrich, with the exception that hydroxypolybutadiene was obtained from Nisso and Ocenol (a mixture of oleo alcohol and linoleo alcohol) was obtained from Henkel. 110/130 and 90/95 indicate the iodine number of the Ocenol.

TABLE 5

| Polymer # | Transesterifying compound | % conversion of methyl acrylate groups |
|---|---|---|
| V | 2-ethylhexyl alcohol | 86% |
| W | $C_{16}$ alcohol | 95% |
| X | 3,5-di-t-butyl-4-hydroxybenzyl alcohol | — |
| Y | Phenethyl alcohol | 81% |
| Z | Nerol/geraniol | 72% |
| AA | Ocenol 110/130 | 56% |
| AB | Ocenol 90/95 | 61% |
| AC | Dihydroxypolybutadiene | -5- |
| AD | Cinnamyl alcohol | 69% |
| AE | $C_{10}$ alcohol | — |
| AF | monoether of polyethylene glycol | — |
| AG | N,N-dimethylethanol | 75% |
| AH | trimethylpropane diallyl ether alcohol | 21% |

EXAMPLE 46

Oxygen Scavengers From Selected Specialty Polymers 1000 ppm Co from cobalt neodecanoate (unless otherwise indicated) was uniformly mixed into pellets of selected polymers of Tables 4 and 5 above, and mono-layer film was extruded substantially by the method of Example 27. Each film was irradiated for 20 minutes with a Blak-Ray UV lamp (254 nm, 5 mW/cm$^2$) and was placed in a 1000 cc bottle containing atmospheric air. The bottle was maintained at room temperature (unless otherwise indicated), and the amount of oxygen scavenged was determined periodically and divided by the weight of the polymer sample in the bottle. The oxygen scavenging results are listed in Tables 6–16.

TABLE 6

Oxygen scavenging results using polymer Y

| Time, days | $O_2$ uptake, ml/g |
|---|---|
| 0.0 | — |
| 1.0 | 3.30 |
| 2.0 | 3.30 |
| 3.0 | 4.29 |
| 6.0 | 8.23 |
| 7.0 | 9.71 |
| 8.0 | 12.16 |
| 14.0 | 27.30 |
| 21.0 | 46.29 |
| 27.0 | 62.95 |
| 31.0 | 73.11 |
| 38.0 | 82.95 |

TABLE 7

Oxygen scavenging results using polymer O

| Time, days | $O_2$ uptake, ml/g using Co neodecanoate | $O_2$ uptake, ml/g using Co benzoate |
|---|---|---|
| 0.0 | — | — |
| 0.2 | 3.49 | 2.00 |
| 1.0 | 14.27 | 1.79 |
| 2.0 | 37.54 | 3.58 |
| 6.0 | 64.55 | 51.78 |
| 9.0 | 71.96 | 65.85 |
| 13.0 | 75.59 | 70.97 |

TABLE 8

Oxygen scavenging results at room temperature using polymers P and Q

| Time, days | $O_2$ uptake, ml/g, for polymer P | $O_2$ uptake, ml/g, for polymer Q |
|---|---|---|
| 0.0 | — | — |
| 1.0 | 13.25 | 30.66 |
| 2.0 | 20.69 | 48.52 |
| 3.0 | 26.62 | 56.87 |
| 6.0 | 35.50 | 68.71 |
| 8.0 | 39.43 | 73.82 |
| 10.0 | 40.90 | 76.61 |
| 15.0 | 46.27 | 82.81 |
| 20.0 | 48.71 | 85.10 |
| 24.0 | 50.65 | 86.80 |

TABLE 9

Oxygen scavenging results at 5° C. using polymers P and Q

| Time, days | $O_2$ uptake, ml/g, for polymer P | $O_2$ uptake, ml/g, for polymer Q |
|---|---|---|
| 0.0 | — | — |
| 1.0 | 2.80 | 7.28 |
| 2.0 | 6.27 | 17.69 |
| 3.0 | 9.24 | 25.11 |
| 4.0 | 13.18 | 33.00 |
| 7.0 | 22.03 | 45.78 |
| 8.0 | 23.50 | 48.23 |
| 9.0 | 26.43 | 50.67 |
| 14.0 | 31.79 | 57.68 |
| 18.0 | 33.73 | 60.74 |

TABLE 10

Oxygen scavenging results at room T using polymer Z

| Time, days | O₂ uptake, ml/g |
|---|---|
| 0.0 | — |
| 0.3 | 8.27 |
| 1.0 | 27.12 |
| 2.0 | 53.33 |
| 5.0 | 92.52 |
| 6.0 | 99.1 (essentially all O₂ removed from 1000 cc headspace -- bottle was refilled with air) |
| 7.0 | 15.92 |
| 8.0 | 18.90 |
| 9.0 | 23.35 |
| 12.0 | 32.22 |
| 13.0 | 34.68 |
| 14.0 | 37.62 |
| 16.0 | 39.57 |
| 19.0 | 42.98 |
| 23.0 | 46.38 |
| 30.0 | 50.25 |
| 35.0 | 49.77 |
| 40.0 | 49.77 |

NOTE: polymer extruded as gels in a lace matrix, with approximately 50% void space

TABLE 11

Oxygen scavenging results at 5° C. using polymer Z

| Time, days | O₂ uptake, ml/g |
|---|---|
| 0.0 | — |
| 1.2 | 8.77 |
| 2.0 | 19.68 |
| 3.0 | 26.11 |
| 4.0 | 35.97 |
| 7.0 | 58.19 |
| 8.0 | 62.80 |
| 9.0 | 67.33 |
| 14.0 | 81.66 |
| 18.0 | 90.07 |
| 25.0 | 96.67 |
| 30.0 | 100.65 |
| 35.0 | 102.57 |

NOTE: polymer extruded as gels in a lace matrix, with approximately 50% void space

TABLE 12

Oxygen scavenging results using polymers AA and AB

| Time, days | O₂ uptake, ml/g, polymer AA | O₂ uptake, ml/g, polymer AB |
|---|---|---|
| 0.0 | — | — |
| 1.0 | 22.20 | 25.19 |
| 2.0 | 33.12 | 40.56 |
| 5.0 | 51.91 | — |
| 6.0 | 56.89 | — |
| 7.0 | 61.26 | 76.81 |
| 9.0 | 68.22 | — |
| 12.0 | 75.40 | — |
| 16.0 | 81.63 | — |
| 19.0 | 84.69 | — |
| 23.0 | 87.84 | — |
| 28.0 | 90.30 | — |
| 33.0 | 91.84 | — |

NOTE: lines in tables in place of values indicate that samples were not taken or were not analyzed

TABLE 13

Oxygen Scavenging results using polymer AC

| Time, days | O₂ uptake, ml/g |
|---|---|
| 0.0 | — |
| 1.0 | 7.78 |
| 2.0 | 14.72 |
| 5.0 | 26.59 |
| 6.0 | 29.05 |
| 7.0 | 32.98 |
| 9.0 | 35.93 |
| 12.0 | 40.81 |
| 16.0 | 46.17 |
| 19.0 | 49.08 |
| 23.0 | 52.95 |
| 28.0 | 56.76 |
| 33.0 | 59.75 |

TABLE 14

Oxygen scavenging results using polymer AD

| Time, days | O₂ uptake, ml/g |
|---|---|
| 0.0 | — |
| 1.0 | 3.30 |
| 4.0 | 4.79 |
| 5.0 | 6.27 |
| 6.0 | 11.20 |
| 8.0 | 28.40 |
| 11.0 | 41.63 |
| 12.0 | 44.56 |
| 13.0 | 48.46 |
| 14.0 | 50.40 |
| 18.0 | 57.13 |
| 21.0 | 60.84 |
| 27.0 | 66.28 |

TABLE 15

Oxygen scavenging results using polymer S

| Time, days | O₂ uptake, ml/g |
|---|---|
| 0.0 | — |
| 0.2 | 9.98 |
| 1.0 | 37.24 |
| 2.0 | 49.08 |
| 3.0 | 55.41 |
| 6.0 | 68.58 |
| 7.0 | 71.65 |
| 14.0 | 82.12 |
| 17.0 | 84.67 |
| 20.0 | 86.53 |
| 23.0 | 86.99 |
| 29.0 | 87.96 |

TABLE 16

Oxygen scavenging results using polymers T and U

| Time, days | O₂ uptake, ml/g, polymer T | O₂ uptake, ml/g, polymer U |
|---|---|---|
| 0.0 | — | — |
| 0.2 | — | 2.99 |
| 1.0 | 2.80 | 4.79 |
| 2.0 | 4.29 | 10.1 |
| 3.0 | — | 21.9 |
| 5.0 | 14.18 | — |
| 6.0 | 18.12 | 45.7 |
| 7.0 | 22.55 | — |

TABLE 16-continued

Oxygen scavenging results using polymers T and U

| Time, days | O₂ uptake, ml/g, polymer T | O₂ uptake, ml/g, polymer U |
|---|---|---|
| 8.0 | — | 56.3 |
| 9.0 | 28.43 | — |
| 10.0 | — | 65.1 |
| 12.0 | 35.75 | — |
| 13.0 | — | 73.7 |
| 16.0 | 45.49 | — |
| 17.0 | — | 82.3 |
| 21.0 | — | 87.0 |
| 27.0 | — | 93.1 |

EXAMPLE 47

Solution Transesterification Using Oleyl Alcohol

Ethylene-methyl acrylate copolymer having 24% MA and 2 MI was transesterified using oleyl alcohol substantially by the method of Ex. 3.34% of the methyl acrylate groups were converted to oleyl acrylate groups. 1000 ppm cobalt as cobalt neodecanoate was uniformly mixed into the transesterified polymer, and a film of the polymer was made substantially by the method of Ex. 27. The performance of this composition in scavenging oxygen is summarized in Tables 17 and 18.

TABLE 17

| Time, days | O₂ uptake, ml/g, room temperature |
|---|---|
| 0.0 | — |
| 0.2 | 3.30 |
| 1.0 | 8.26 |
| 2.0 | 15.68 |
| 5.0 | 33.42 |
| 7.0 | 42.76 |
| 9.0 | 51.58 |
| 12.0 | 60.82 |
| 16.0 | 68.12 |
| 19.0 | 72.00 |
| 23.0 | 77.04 |

TABLE 18

| Time, days | O₂ uptake, ml/g, 23° C. | O₂ uptake, ml/g, 6° C. |
|---|---|---|
| 0.0 | — | — |
| 1.0 | 9.27 | 4.79 |
| 2.0 | 15.72 | 8.26 |
| 3.0 | 21.16 | 11.72 |
| 6.0 | 37.43 | 15.67 |
| 7.0 | 42.34 | 17.14 |
| 8.0 | 44.79 | 18.61 |
| 9.0 | 49.19 | 20.08 |
| 10.0 | 54.15 | 22.03 |
| 13.0 | 61.97 | 27.85 |
| 14.0 | 63.66 | 29.30 |
| 15.0 | 66.61 | 31.23 |
| 16.0 | 68.53 | 32.68 |
| 20.0 | 73.28 | 40.35 |
| 23.0 | 76.19 | 45.61 |
| 29.0 | 79.48 | 50.85 |

What is claimed is:

1. A process comprising:
   A. forming a melt of a polymer having a polyethylenic backbone and pendant ester and/or acid moieties; and
   B. contacting the melt with a transesterifying compound in an extruder under transesterification conditions, where the polymer undergoes esterification and/or transesterification but not alcoholysis, and the polymer after esterification or transesterification has a polyethylenic backbone and pendant ester and/or acid moieties.

2. The process of claim 1 further comprising contacting the melt with a transesterification catalyst.

3. The process of claim 1 wherein the reaction occurs essentially at atmospheric pressure.

4. The process of claim 1 further comprising adding an amount of transition metal salt that is effective to promote oxygen scavenging in the transesterified polymer.

5. The process of claim 4 wherein the transition metal salt comprises a cobalt metal salt.

6. The process of claim 4 further comprising irradiating the transesterified polymer with actinic radiation.

7. The process of claim 1 wherein the polymer comprises ethylene alkyl acrylate copolymer, ethylene acrylic acid copolymer, or ethylene alkyl acrylate copolymer grafted with maleic anhydride.

8. The process of claim 7 wherein the polymer comprises ethylene methyl acrylate copolymer.

9. The process of claim 7 wherein the transesterifying compound comprises a compound selected from the group consisting of benzyl alcohol, 3-methoxybenzyl alcohol, 3-methylbenzyl alcohol, hydroxypoly(1,2-butadiene), 6,6-dimethylbicyclo[3.1.1]hept-2-ene-ethanol, 3-methyl-3-butenyl alcohol, 2,6-dimethyloct-2,6-dienyl alcohol, cinnamyl alcohol, trimethylpropane diallyl ether alcohol, 2,6,10-trimethyldodec-2,6,10-trienyl alcohol, ocenol, oleo and/or linoleo alcohol, 3,5-di-t-butyl-4-hydroxybenzyl alcohol, 2,4-dihyroxylbenzophenone, hydroxylphenylbenzotriazole, and hydroxybenzylphenone.

10. The process of claim 8 wherein the transesterifying compound comprises a compound selected from the group consisting of benzyl alcohol, 3-methoxybenzyl alcohol, 3-methylbenzyl alcohol, hydroxypoly(1,2-butadiene), 6,6-dimethylbicyclo[3.1.1]hept-2-ene-ethanol, 3-methyl-3-butenyl alcohol, 2,6-dimethyloct-2,6-dienyl alcohol, cinnamyl alcohol, trimethylpropane diallyl ether alcohol, 2,6,10-trimethyldodec-2,6,10-trienyl alcohol, ocenol, oleo and/or linoleo alcohol, 3,5-di-t-butyl-4-hydroxybenzyl alcohol, 2,4-dihyroxylbenzophenone, hydroxylphenylbenzotriazole, and hydroxybenzylphenone.

11. The process of claim 10 further comprising adding an amount of transition metal salt that is effective to promote oxygen scavenging in the transesterified polymer.

12. The process of claim 11 further comprising irradiating the transesterified polymer with actinic radiation.

13. The process of claim 1 wherein the polymer comprises an ethylene vinyl acetate copolymer.

14. The process of claim 13 wherein the transesterifying compound comprises phenyl acetic acid.

15. A method of making a polymer having functional side-chains comprising forming a melt of a polymer capable of esterification and/or transesterification and blending the melt with a hydroxy form of the functional additive under esterification and/or transesterification conditions.

* * * * *